United States Patent [19]

Austin et al.

[11] Patent Number: 4,885,684

[45] Date of Patent: Dec. 5, 1989

[54] METHOD FOR COMPILING A MASTER TASK DEFINITION DATA SET FOR DEFINING THE LOGICAL DATA FLOW OF A DISTRIBUTED PROCESSING NETWORK

[75] Inventors: Edward B. Austin, Woodbridge; Jeffrey E. Robertson, Manassas, both of Va.

[73] Assignee: International Business Machines Corporation, Armonk, N.Y.

[21] Appl. No.: 129,269

[22] Filed: Dec. 7, 1987

[51] Int. Cl.[4] .................... G06F 9/44

[52] U.S. Cl. .................... 364/300; 364/200; 364/280.4

[58] Field of Search .................... 364/200, 300, 900

[56] References Cited

U.S. PATENT DOCUMENTS 4,309,756 1/1982 Beckler .................... 364/300

*Primary Examiner*—Raulfe B. Zache

*Attorney, Agent, or Firm*—John E. Hoel

[57] ABSTRACT

A compiler method is disclosed which defines a data flow for a specific complex function to be executed on a plurality of data processing elements in a distributed processing system, by means of defining a plurality of control blocks which are associated with each task. The control blocks are in relocatable code so that they may be associated with any one of several similar types of data processing elements within the distributed processing network. The control blocks include local operating system control blocks, token control, post and wait control blocks, and processing element task execution control blocks. The use of the distributed processing system compiler method enables the quick and easy implementation of complex functions having interdependent processing tasks in a distributed processing system.

6 Claims, 17 Drawing Sheets

FIG. 1

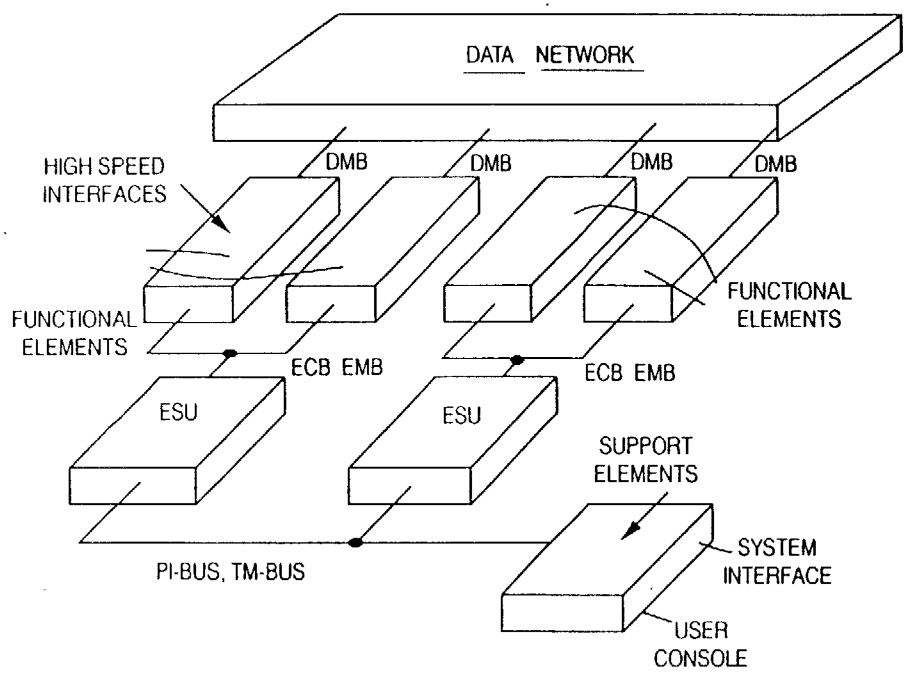

- GLOBAL INTERFACES
  - --- PI-BUS
  - --- TM-BUS
  - ---SYSTEM BREAKPOINT LINE
  - --- CLOCKS & SYSTEM RESET
- FUNCTIONAL ELEMENT INTERFACES
  - --- DATA NETWORK INTERFACES
  - --- ELEMENT CONTROL BUS
  - --- ELEMENTMAINTENANCE BUS
  - ---CLOCKS & SYSTEM RESET

- MODULAR ARCHITECTURE
  - --- CORE MODULES
  - --- FUNCTIONAL ELEMENTS
  - --- SUPPORT ELEMENTS
- CORE MODULES
  - --- DATA NETWORK ELEMENT DNE
  - --- ELEMENT SUPERFVISOR UNIT ESU
- FUNCTIONAL ELEMENT MODULES
  - --- MEMORY GM
  - --- PROCESSING ELEMENT FPPE
  - --- SENSOR I/O, HIGH SPEED SI
  - --- PRE / COPROCESSOR —
- SUPPORT ELEMENT MODULES
  - --- GENERAL PURPOSE COMPUTER 1750A CPU
  - --- SYSTEM I /O, LOW SPEED 1553B
  - --- SYSTEM I /O, HIGH SPEED HSSB
  - --- USER CONSOLE INTERFACE UCIF
- POWER SUPPLY MODULES
  - --- + 5V (TYPE I) PSI
  - --- +5V (TYPE II) PS II
  - --- + 3.3VI + 2.0V PS III
  - --- ± 15 V PS IV
- MISCELLANEOUS MODULES
  - --- TIMING / CONTROL GEN. MODULE TCG
  - --- I / O-TERMINATOR MODULE ( 2 ) PBT, IOT

FIG. 5

| COMMAND | FUNCTION |
|---|---|
| MULTIPLE PROGRAM SERVICES | |
| O ACTIVE_PROGRAM | - START ANOTHER MULTIPLE PROGRAM |
| O ACQUIRE_SYS_BUFFER | - GET BUFF FOR INTER PRGM MSG |
| O RELAY_SYS_BUFFER | - RETURN BUFFER TO SYSTEM POOL |
| O ENQUEUE_BUFFER | - SEND DATA / MSG TO ANOTHER PRGM |
| O DEQUEUE_BUFFER | - WAIT FOR INTER-PRGM MSGS |
| O ENTER_CRITICAL | - LOCK OUT SHARED DATA |
| O LEAVE_CRITICAL | - UNLOCK |
| COMMUNICATIONS MANAGEMENT | |
| O ESTABLISH_CMMB | - SET UP SEND-PORT TO ANOTHER CPU |
| O ESTABLISH_UMMB | - SET UP RCV-PORT FOR MSGS |
| O RELEASE_UMMB | - RELEASE RCV-PORT |
| O SEND_PI_BUS MESSAGE | - SEND A MSG TO A PORT |
| O RECEIVE-PI_BUS-MESSAGE | - WAIT FOR MSG FROM A PORT |
| O RELEASE_INPUT_MESSAGE_AREA | - RELEASE RCV MSG BUFF |
| GRAPH MANAGEMENT | |
| O BEGIN-INSTANCE_CREATION | - GET GRAPH HANDLE |
| O SET_GRAPH_CONSTANT | - SET UP ANY CONSTANTS |
| O COMPLETE_INSTANCE | - DOWNLOAD GRAPH AUS FROM GM TO FES |
| O DELETE_INSTANCE | - REMOVE A GRAPH |
| O ACTIVATE_INSTANCE | - MAKE A GRAPH ACTIVE |
| O SUSPEND_INSTANCE | - STOP A GRAPH FROM EXECUTING |
| O INSTANCE_TO_INSTANCE_CONNECT | - CONNECT 2 GRAPHS TOGETHER |
| O INSTANCE_TO_INSTANCE_DISCONNECT | - DISCONNECT 2 CONNECTED GRAPHS |
| O SET_GRAPH_VARIABLE | - CHANGE A VARIABLE IN A GRAPH |
| O SET_GRAPH_SWITCH | - CHANGE THE FLOW OF GRAPH DATA |
| DIAGNOSTICS CONTROL | |
| O MODIFY_Dx_PERIOD | - CHANGE THE PERIOD AT WHICH IT RUNS |
| O BEGIN_SI_TEST | - TEST THE SENSOR INTERFACE |
| PROCESSOR (CPU) CONTROL | |
| O Do_XIO | - ISSUE AN EXTERNAL I/O CMND |
| O ENABLE_INTERRUPTS | - ENABLE INTERRUPTS |
| O DISABLE_INTERRUPTS | - DISABLE INTERRUPTS |
| O SET_USER INTERRUPT_MASK | - CONTROL USER INTERRUPTS |
| O SUSPEND_UNTIL_INTERRUPT | - WAIT FOR AN INTERRUPT |
| O REGISTER_INTERRUPT_EVENT | - REGISTER FOR AN INTERRUPT |
| O ENTER PRIVILEGED | - ENTER PRIVILEGED STATE |
| O LEAVE PRIVILEGED | - LEAVE PRIVILEGED STATE |
| TIMER MANAGEMENT | |
| O READ_RTC | - READ THE REAL TIME CLOCK |
| O SETUP_TIMED_INTERVAL | -SET UP TO BE POSTED AFTER X MS |
| O DELETE_TIMED_INTERVAL | -DELETE POSTING AFTER X MS |
| ERROR NOTIFICATION | |
| O REGISTER_FOR_ERROR | - IDENTIFY PRGM TO GET ERR NOTICES |
| APPLICATIONS LOADING AND STARTUP | |
| O BEGIN_DIAGNOSTICS | - START DIAGNOSTICS RUNNING |
| O ELEMENT-LOAD | - LOAD SYSTEM DATA PROCESSORS & FE MEMORIES |

FIG. 7

```
GRAPH SPOTLIGHT-SAR
INTERFACE
  INPUT-IF        GRAPH-SENSOR-INPUT...
  RECEIVE-IF      GRAPH-WEIGHT-RECEIVE...
  RECEIVE-IF      FORMATTED-TARGET..
  OUTPUT-IF       GRAPH-MAP-OUTPUT...
  OUTPUT-IF       GRAPH-FORMATTED-TARGET-OUTPUT
  SEND-IF         TARGET-SEND...
  GC-IF           TARGET-SEND-IF-LABEL....
ATTRIBUTES
  1, 2, 5; -- GRAPH PRIORITY, TASK AND MESSAGE RETRY.
DECLARATIONS
      TASK  PULSE-INPUT.......;
      TASK  PULSE-CONDITION....;              -- DETAILS OF THESE
      TASK  WEIGHT-INPUT......;               -- TASKS AND STORAGE
      TASK  MAP-GENERATION.....;              -- OBJECTS NOT SHOWN
      TASK  TARGET-DETECTION....;
      TASK  MAP-OUTPUT.....;
      TASK  TARGET-SEND......;
      STORAGE-OBJECT  PULSE-INPUT.....;
      STORAGE-OBJECT  WEIGHT-INPUT.....;
      STORAGE-OBJECT  CORN-TURN-PRE-FFT.....;
      STORAGE-OBJECT  CORN-TURN-POST-FFT.....;
      STORAGE-OBJECT  MAP-OUTPUT-BUFF....;
      STORAGE-OBJECT  TARGET-SEND-BUFFER....;
      AU  FPPE-AU, FPPE;
      AU  GM-AU, GM;
      AU si-au, SI;
   BEGIN
      t1-1:  PULSE-INPUT;          s1-1:  PULSE-INPUT;
      t2:    WEIGHT-INPUT;         s2:    WEIGHT-INPUT;
      t3-1:  PULSE-CONDITION;      s3-1:  CORN-TURN-PRE-FFT;
      t3-2:  PULSE-CONDITION;      s3-2:  CORN-TURN-PRE-FFT;
      t3-3:  PULSE-CONDITION;      s4-1:  CORN-TURN-POST-FFT;

      au1:  si-au;
      CONNECT  GRAPH-SENSOR-INPUT    TO  t1. SENSOR-DATA-INPUT;
      CONNECT  GRAPH-WEIGHT-RECEIVE  TO  t2. WEIGHT-DATA-CONSUME-1
      CONNECT  t3-1. SENSOR-DATA-READ-1   TO  s1.SENSOR-DATA-CONSUME-1
      CONNECT  t3-2. SENSOR-DATA-READ-2   TO  s1.SENSOR-DATA-CONSUME-2
      CONNECT  t3-3. SENSOR-DATA-READ-3   TO  s1. SENSOR-DATA-CONSUME-3
      ASSIGN   t1  TO  AU1;  -- ASSIGN AN INSTANCE OF PRESUMMING
      ASSIGN   t2  TO  AU2   -- AND MAP GENERATION TO SAME AU.
      CONSTRAIN AU1  TO  PHYSICAL  > 0, 2 <  -- SENSOR INTERFACE PORT
      CONSTRAIN AU2  TO  PHYSICAL  > 0, 2 <  -- GLOBAL MEMORY PORT
END  SPOTLIGHT-SAR;
```

FIG. 8.

```
TASK pulse-conditioning
  INTERFACE
    READ-IF   sum-channel-read, ...
    READ-IF   delta-channel-read, ...
    READ-IF   weight-read, ...
    WRITE-IF  sum-channel-write, ...
    WRITE-IF  del-channel-write, ...
ATTRIBUTES
    FPPE,...
  BUFFER
    LS-BUFFER  sum-channel-input ...
    LS-BUFFER  delta-channel-input ...
    LS-BUFFER  weight-input ...
                :
                :
    LS-BUFFER  bcc-output ...
  BEGIN
    READ  sum-channel-read, sum-channel-input...
    READ  delta-channel-read, delta-channel-input...
    READ  weight-read ...
   EXECUTE  unpk ...
    EXECUTE  fxfl ....
    EXECUTE  mwta ....
    EXECUTE  bcc  ....
    WRITE  bcc-output-sum ...
    WRITE  bcc-output-delta ...
 END fft;
```

```
STORAGE-OBJECT  weight-data
  INTERFACE
    PRODUCE-IF  sensor-data-produce ...
    CONSUME-IF  sensor-data-consume-1 ...
    CONSUME-IF  sensor-data-consume-2 ...
    CONSUME-IF  sensor-data-consume-3 ...
  ATTRIBUTES
    QUEUE ...
  BEGIN
    QUEUE-ACCESS  sensor-data-produce ...
    QUEUE-ACCESS  sensor-data-consume-1 ...
    QUEUE-ACCESS  sensor-data-consume-2 ...
    QUEUE-ACCESS  sensor-data-consume-3 ...
END weight-data;
```

METHOD FOR COMPILING A MASTER TASK DEFINITION DATA SET FOR DEFINING THE LOGICAL DATA FLOW OF A DISTRIBUTED PROCESSING NETWORK

BACKGROUND OF THE INVENTION

1. Technical Field

The invention disclosed broadly relates to data processing techniques and more particularly relates to a method for controlling a distributed processing network and the processors and I/O units connected therewith.

2. Background Art

High speed general purpose data processing systems have been designed in the prior art to handle certain generic types of data processing problems. In particular, data processing systems designed to handle a variety of matrix manipulation problems, called array processors, have become exceedingly important in signal analysis where signals are characterized by means of digital filtering and fast Fourier transform analysis. A specific example of such a prior art system is shown in U.S. Pat. No. 4,041,461 by Gary L. Kratz, et al., assigned to the instant assignee, which discloses a signal analyzer system. In the prior art multiprocessing system represented by the Kratz, et al. patent, a control processor was required to continually issue specific command words to an arithmetic processor and a storage transfer controller and a typical problem solution would require that about 70 percent of the control processor's time be devoted to the preparation of commands dealing with arithmetic and memory to be carried out by the arithmetic processor or the storage transfer controller. In addition, when mutually dependent functions were to be performed by the arithmetic processor and the storage transfer controller, then the arithmetic processor had to indicate to the storage transfer controller when to unload the results of the arithmetic process, by communicating the completion status points between these dependent processors through the control processor itself. This resulted in impeding the total throughput of the system and rendering it difficult to expand to control additional dependent processors.

An improvement in distributed control for carrying out mutually dependent operations in a distributed processing system was accomplished by the U.S. Pat. No. 4,149,243 to Wallis, assigned to the instant assignee. Wallis described a distributed control architecture for a multiprocessor system which included the control processor operating on system programming instruments for executing system supervisory and task management functions. These functions were signaled over a control bus. Connected to the control bus is a first subunit processor and a second subunit processor, each for executing different types of data processing functions. A post and wait logic unit interconnected the first and second subunit processors to enable the direct signaling of the completion of mutually dependent operations. Thus, the control processor was free to initiate tasks to be performed by the first and second subunit processors and then the subunit processors would continue the execution of their respective operations, signaling post and wait control signals between each other as mutually dependent operations were completed.

A problem with the prior is that when there are three or more processors in a distributed processing network, the problem of distributing the overall complex function to be performed between the plurality of processors is time consuming, difficult to maintain, difficult to change. In order to program a distributed processing network, the programmer will assign component data processing tasks to each of the plurality of processors in the network. If the processing loads were to remain the same over time for each of the component data processors, then the programmer could expect that the overall complex function would be successfully executed in a reasonably efficient manner. However, because of changes over time and the data flowing through particular input/output units and because of the failure of particular data processing components in the network, the recovery of the system or the rebalancing of the load on the system requires the reassignment of some data processing tasks to other data processing components in the network. The problem with doing this is maintaining accountability of the new data processing element for the task it has just been assigned, of relating that physical data processing element to the task to be performed and identifying that data processor as the physical location for the performance of that task. Therefore it is very desirable to have the component data processing tasks which make up the overall complex data processing function to be performed, to be relocatable to diverse ones of the physical data processing elements in the network. This presents a tremendous problem for the programmer. In the prior art, virtually the only way to accommodate such a redistribution of tasks among the physical data processing units was to have a programmer manually reenter the control information, identifying the newly assigned data processing elements for the relocated tasks to be performed.

OBJECTS OF THE INVENTION

It is therefore an object of the invention to provide an improved method for controlling a distributed data processing network.

It is another object of the invention to provide an improved technique for controlling the interdependent functions performed by the elements in a distributed processing network.

It is yet a further object of the invention to provide an improved technique for defining the partitioning of a large complex logical function into a plurality of component functions to be distributed as tasks to a plurality of data processing elements in a distributed processing network.

It is a yet a further object of the invention to provide an improved technique for redeploying component data processing tasks to diverse ones of the data processing elements in a distributed processing network, on a real time basis.

It is still a further object of the invention to provide an improved technique for compiling a master task definition data set for defining a logical data flow of a distributed processing network for accomplishing a specific complex logical function.

SUMMARY OF THE INVENTION

These and other objects, features and advantages of the invention are accomplished by the compiler for a data flow architecture invention disclosed herein. The invention is called a graph translator and is applied to a distributed processing system which includes a plurality of distributed data processing elements. Each of the elements has a local operating system for controlling the operations therein and each has an associated storage for storing at least one control block for defining functions to be performed by that data processing element in accordance with its local operating system. The plurality of data processing elements is interconnected by a data bus and a control bus. In accordance with the invention, a method is disclosed for compiling a master task definition data set for defining the logical data flow of the distributed processing network for accomplishing a specific complex logical function. The method includes inputting a user defined task description in the form of a high level language instruction which specifies what the task does, which other tasks a given task is associated with, and on what data processing element a given task is to be executed. The control blocks are of three different types, a first type for controlling the execution of tasks within the data processing element, a second type controlling the transfer of data between tasks, and a third type for controlling interdependent tasks by sending control tokens between the tasks. The method of the invention further includes assembling addresses and routing information in the control blocks to enable interconnection of tasks, as specified in the master task definition data set. The method further includes assembling user defined parameters in the master task definition data set, into respective ones of the control blocks. A method further includes assembling a dependency mask in respective ones of the control blocks which defines the tokens necessary to authorize the execution of a task. The method then outputs a bit map representation of the plurality of control blocks to enable the distributed processing network to carry out the specific complex function.

BRIEF DESCRIPTION OF THE DRAWINGS

These and other objects, features and advantages of the invention will be more fully appreciated with reference to the accompanying figures.

FIG. 1 shows the CSP configuration architecture.

FIG. 5 shows the local operating system interface commands.

FIG. 7 shows the SAR graph specification, using graph notation.

FIG. 8 shows the task specification, using CSP graph notation.

DESCRIPTION OF THE BEST MODE FOR CARRYING OUT THE INVENTION

Figure 2:
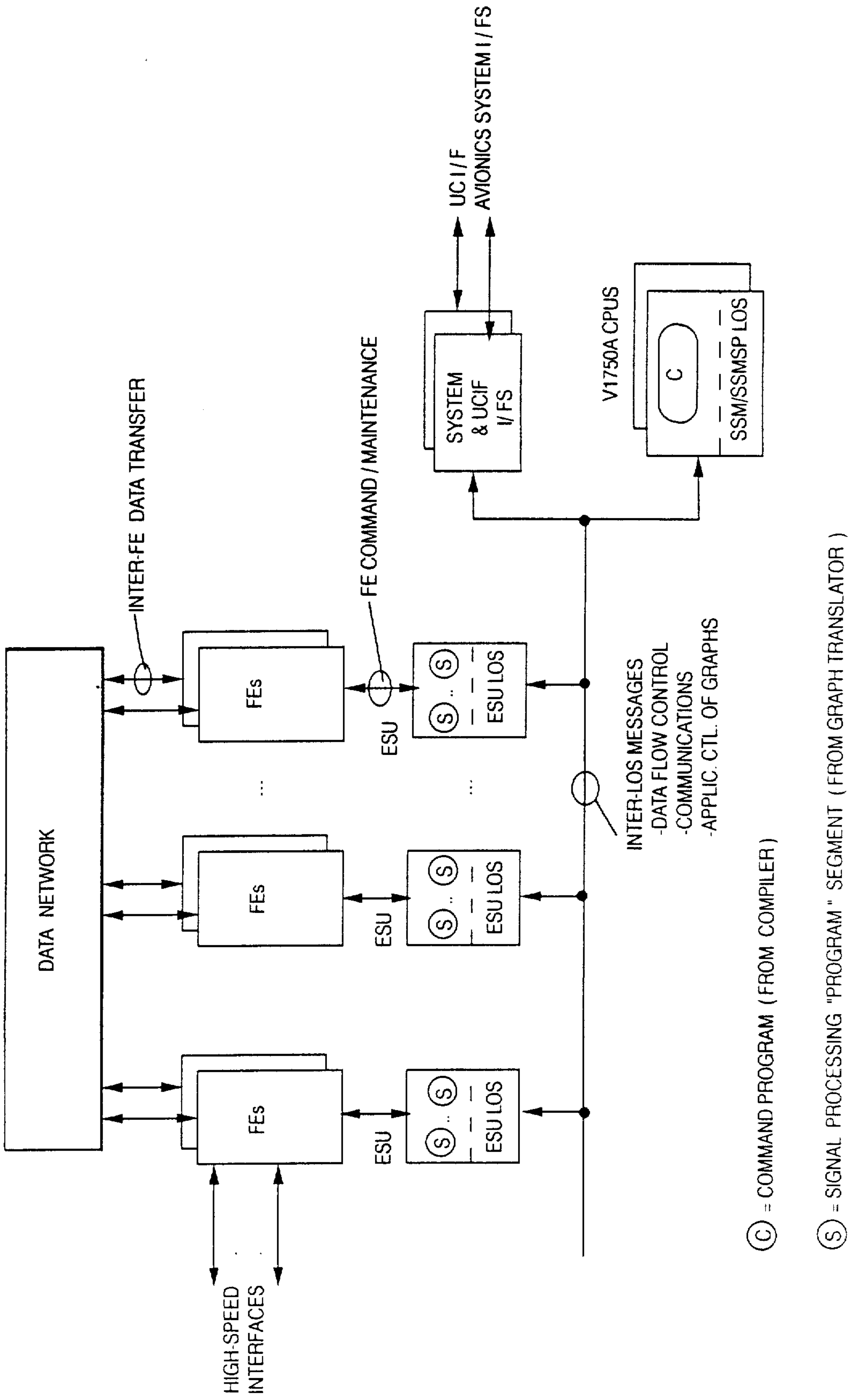
FIG. 2 shows the CSP system structure.

The invention disclosed herein is a compiler for a data flow architecture, referred to herein as a graph translator. In order to describe the graph translator invention, it is necessary to first explain the context within which it is applied. Thus, an example is first given of a data processing hardware architecture and its operating system software and a specification of an application to be programmed, for which the graph translator invention is used to generate run-time, executable application code.

The graph translator invention is applied to a distributed processing system. The example system disclosed herein is the common signal processor (CSP), which is described in conjunction with its operating system software and an example application.

COMMON SIGNAL PROCESSOR

A programmable signal processor called common signal processor (CSP) provides the configurability, modularity, expandability, programmability, supportability, and application development environment needed by applications engineers to tailor a signal processor to their functional, performance and availability requirements.

Signal processors receive digitized waveforms from sensors, perform a wide variety of analysis and processing functions on the data, and prepare results for display or output to general purpose processors that post processing. Signal processors are often required to perform several functions concurrently, including commanding the sensor itself. A given platform may contain several subsystems, each containing a signal processor performing a set of processing functions unique to its associated sensors and the current mission scenario.

To meet the performance demands, distributed processing techniques must be used. To cost-effectively meet the broad range of intended applications, CSP has been made to be modular in every area. The operating system provides a standard, unified view of the processor resources and adapts to any CSP configuration. To support application development, tools are provided to support design, coding, simulation, and test at all levels of programmability of a CSP configuration.

CSP ARCHITECTURE

CSP is an architecture rather than a single configuration. As shown in FIG. 1, a CSP configuration is a multiprocessor consisting of a set of modules, the quantity and types of which are application-dependent. The CSP architecture is partitioned into a set of core modules, functional elements modules, and power supply modules.

The infrastructure of any CSP configuration is provided by a set of core modules: data network element modules to construct a modular data network for high-speed interchange of data and element supervisor unit modules to control activities in the functional element modules and coordinate activities between them.

Functional element modules are the major signal processing workhorses of a CSP configuration. They are divided into four categories:

1. memory modules provide bulk storage within a CSP configuration;
2. processing element modules provide the programmable signal processing capability;
3. high-speed I/O modules provide interfaces into and out of a CSP configuration for sensor data, sensor control, inter-CSP data exchange, display data, and high-speed application load of a CSP configuration, and
4. processor modules can be included in a CSP configuration to perform specialized signal processing functions.

Support element modules provide functions ancillary to and in support of the main signal processing flow. They are divided into three categories:

1. general purpose computer modules host application command programs, which establish the processing modules in the CSP configuration, generate sensor control parameters, and communicate with higher-level computers in the system architecture;
2. system I/O modules provide communications paths to these higher-level computers; and
3. a user console interface module is used in a laboratory environment for attachment of a user console to a CSP configuration for debug and test.

The power system is also modular and is divided into two parts: power converter modules and power regulator modules. The power regulator modules plug into the same backplane as the other modules and are dottable; the number of power regulator modules needed is dependent on the power requirements of the logic and memory modules. The power converter modules are located off the backplane and the number used is dependent on the power drawn by the power regulator modules.

Miscellaneous modules include a timing/control generator, which produces clocks, and terminator modules for the global control and maintenance buses (PI-bus and TM-bus).

The modularity of the CSP concept permits choosing a configuration that best meets platform functional, performance, and availability requirements. Smaller configurations may be constructed without large overhead because all parts of the CSP concept are modular. Multiple small CSP configurations may be used to meet system signal processing performance requirements with one or more redundant CSPs used to provide fault tolerance to meet system mission reliability/deferred maintenance requirements. Alternatively, additional modules may be added to CSP configuration to provide the fault tolerance, or a combination of the two schemes may be used to provide very high-availability/long-term deferred maintenance.

The date network, used for high-speed interchange of data between functional elements, is constructed using a building block module called the data network element (DNE). With the DNE module, 16- and 32-bit wide data networks can be configured with as few as six 32-bit ports (using one DNE module) up to any size or interconnection scheme needed as long as no more than eight switching nodes are involved in a path between two function elements. The number of simultaneous paths capable of being routed through the resultant network is dependent on the interconnection scheme chosen. Routing of a path between two functional elements occurs for each block transfer and is based on a set of route addresses associated with the block transfer, one route address per switching node in the path. Links in the network may be shared (on a block transfer basis) by multiple paths. All links are bidirectional and operate at a 25 MHz rate.

The element supervisor unit (ESU) is the common functional element controller used throughout a CSP configuration. It hosts the ESU component of the local operating system (LOS), which provides all capability needed to operate and monitor a functional element. The ESU controls its set of functional elements (up to six) via a 16-bit element control bus (ECB). It uses a serial element maintenance bus (EMB) attached to each of its functional elements to self-test, receive error reports, log errors, read an electronic nameplate, scan registers, and initially configure the modules.

Globally, the ESU communicates with other ESUs and the support modules via a 16-bit parallel interface (PI) bus. The ESU determines when all events have occurred that are necessary to allow a signal processing task, an I/O task, or a storage update operation to occur. The ESUs also schedule the operation, dispatch it to the functional element it is managing or to itself and, after completion, issue any messages on the PI-bus indicating actions to be taken by other ESU. A global test and maintenance (TM) bus is used for off-line and laboratory test, maintenance, and debug functions.

The microprocessor on the ESU implements a MIL-STD-1705A instruction set architecture plus execute input/output (XIOs) to control ECB and EMB operations. The module contains 256K words of program storage plus an 8K word start-up ROM. The ESU is capable of executing 2.8 million instructions per second.

FUNCTIONAL ELEMENTS

The global memory (GM) module provides storage for one million 32-bit words accessible at a 25 MHz rate. Error correction and detection corrects any single chip error within each of the four banks of storage on the module. The module provides addressing modes, which allow the local operating system to treat storage as either first-in/first-out (FIFO) queues or unstructured buffers. These modes include addressing for simple single and multiple circular queues, corner turn queues, coordinate rotation queues, random access queues, and displaced sequential addressing for buffers. All addresses generated are in a virtual address space of 28 bits and converted to a physical address space of up to 24 bits; logical-to-physical address translation is provided to eliminate memory fragmentation as signal processing mode changes occur in the processor.

The floating point processing element (FPPE) provides both floating point and fixed point signal processing capability. It is rated at 125 million floating point operations per second based on performing FFT operations. The module contains two dual 8K 32-bit word local stores for overlapped execution and I/O via the data network.

Each signal processing task dispatched to an FPPE by the ESU contains a list of input, macro, and output operations to be performed. A macro is a microcoded signal processing primitive (e.g., FFT, filter, etc.) contained in an 8K by 128-bit RAM microstore located on the module.

The data flow contains two 24-bit by 24-bit multipliers, two 40-bit accumulators, two 23-function arithmetic/logic units (ALUs), and six 16-operand register files. In addition, coefficients can be read from an 8K word coefficient store or generated by a function generator capable of performing sine, cosine, arctangent, square root, and reciprocal functions.

The sensor interface (SI) module provides a buffered high-speed I/O capability and is used for input of sensor data, output of sensor control information and video data, and I/O associated with inter-CSP traffic or data involving other peripheral devices. The SI external interfaces may be operated in either link (point-to-point to a device or to an external network switch) or ring mode. The module is capable of receiving or transmitting data at a 400 megabit per second rate. In link mode, it can simultaneously transmit and receive. In ring mode, up to 256 terminals (e.g., SI modules) can be addressed and, for a given destination terminal, any one of 256 virtual input channels can be specified. The SI can be used to load the application into a CSP configuration.

SUPPORT ELEMENTS

Three module types from the V1750A program are used in CSP configurations. These are the V1750A central processing unit (CPU), dual MIL-STD-1553B bus interface module, and dual high-speed system bus interface module. In addition, a user console interface module is used to provide attachment of a user console for laboratory use in debug and application development.

The V1750A CPU provides approximately three MIPS of general purpose computing capability and is used in a CSP configuration to host the subsystem manager (SSM) portion of the local operating system; it is also used as backup for the SSM, and as SSM support processor (SSMSP). The SSM provides all central management of the assets of a CSP configuration. The SSM backup, if used, provides a replacement for the SSM in the event of its failure.

Application programs run in the SSM V1750A CPU and any SSM support processors; they inter-communicate via the PI-bus.

The bus interface modules provide communication paths to system interfaces—either MIL-STD-1553B or high-speed system bus (HSSB). It is via these interfaces that system-level control is received by a CSP configuration, status and fault reports are sent by the CSP configuration, other system data are interchanged, and the CSP requests and receives a system program loader during start-up. It can also receive the remainder of the application program load via one of these interfaces.

LOCAL OPERATING SYSTEM (LOS)

The LOS provides the user with the following capabilities:

1. application execution support,
2. mode management,
3. resource management,
4. configuration management,
5. communications services,
6. availability management,
7. error handling/error recovery,
8. timer services,
9. system start-up, and
10. debug.

LOS is divided into four parts: ESU component, subsystem manager (SSM) component, SSM support processor (SSMSP) component, SSM backup component. FIG. 2 illustrates a CSP configuration with LOS components located in the ESU and V1750A CPU modules.

There is one copy of the ESU component per ESU. It is configuration-independent. An ESU contains LOS system code only, no application code. Tables defining function to be performed for each signal processing mode are downloaded from a memory-type functional element into an ESU when a mode is started. The ESU component of LOS supports its attached functional elements; the configuration of elements in its group is determined by the ESU LOS component at start-up. The ESU LOS component is responsible for control of operations performed by the functional elements, including on-line diagnostics support. The ESU LOS component is also allocated the local availability management functions associated with its functional elements. Reports are made to the central availability manager (a part of the SSM component of LOS).

The SSM component of LOS is hosted in a designated V1750A CPU. There is one SSM LOS component per CSP configuration. The SSM host is determined during application load and the SSM determines and manages the configuration of the CSP it finds itself in. The SSM LOS is linked to an application command program. LOS services available to the application command program include mode management, communications, configuration management, and timer services. The SSM LOS contains the centralized functions and retained data associated with CSP configuration management, resource utilization management, and availability management.

The SSMSP component of LOS can be hosted in V1750A CPUs. There are zero or more SSMSP LOS components per CSP configuration. If used, the SSMSP LOS, which is linked to an application command program, supports a multiple processor environment (i.e., multiple V1750A CPUs) to be established by the user within a CSP configuration. The application command program linked with the SSMSP LOS has the same set of services available to it as the application command program linked to the SSM LOS, except any requests associated with modes and configuration are relayed via the PI-bus to the SSM LOS.

The SSM backup component of LOS can be hosted in a V1750A CPU. There is zero or one SSM backup per CSP configuration. It is also linked with an application command program and is, in fact, the same load image as that loaded into the SSM processor. However, the component of LOS initializes to act as a backup. The same operations are performed within the backup but messages from the backup are not output. If it is determined that the SSM processor has failed, the backup becomes the new SSM.

FAULT DETECTION

Built into a CSP configuration is support for high reliability/deferred maintenance, organization-level maintenance and depot maintenance.

CSP configurations are reliable due to their use of built-in fault-tolerance features. Fault tolerance starts with a highly effective error detection and fault isolation capability. The goal is detection of 98 percent of all errors and isolation of a fault to a single module in 96 percent of the cases. Detection of errors is provided by both concurrent on-line hardware checkers and periodic, non-invasive on-line diagnostic tests. CSP uses concurrent on-line testing; 74 percent of all errors are detected by built-in hardware checkers. This provides both rapid detection of solid errors without using processing resources to run on-line tests and allows detection of the majority of transient errors.

Figure 3:
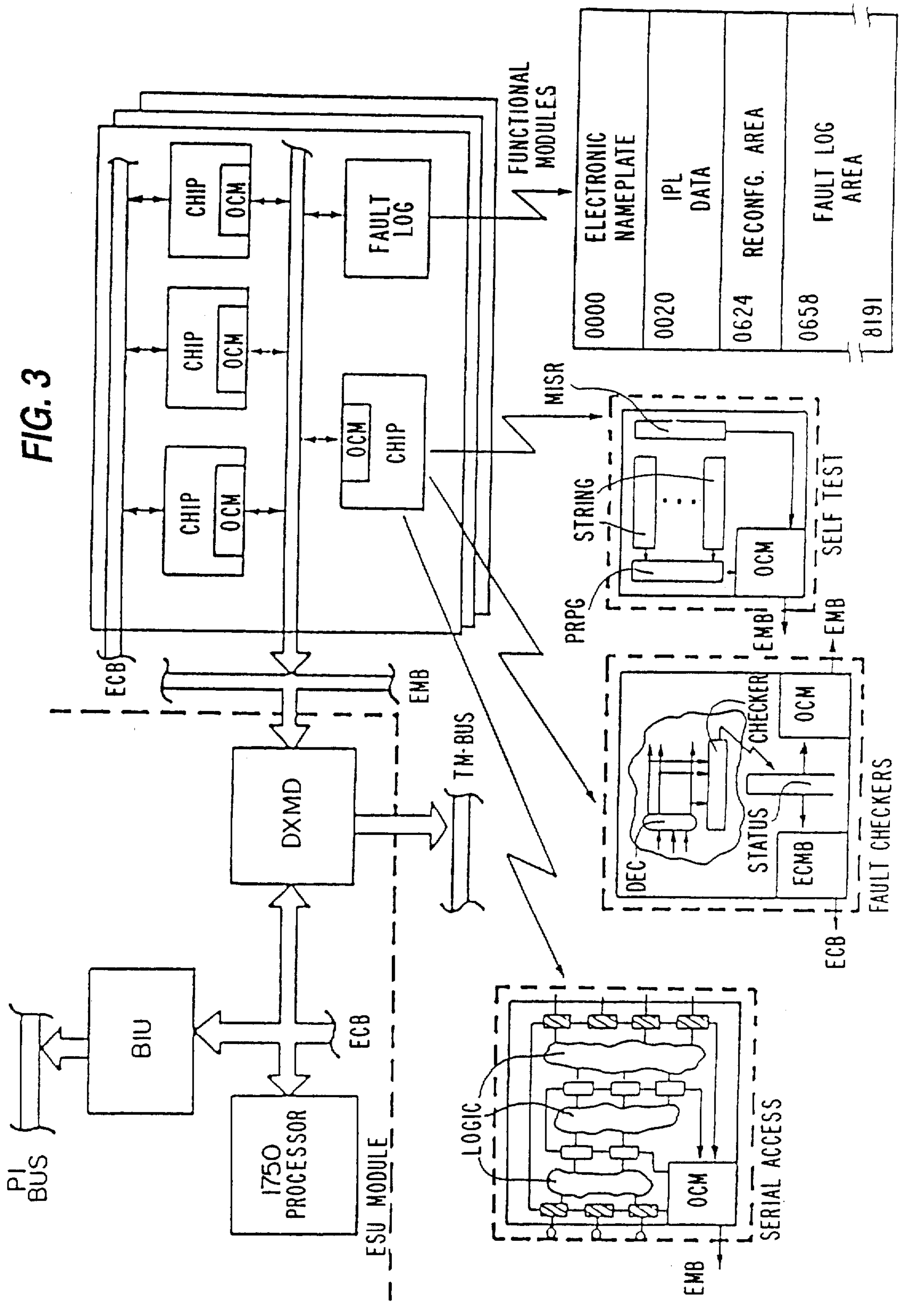
FIG. 3 shows the CSP hardware fault detection and reporting.

FIG. 3 illustrates the components of the hardware fault detection and reporting system. At the lowest level, each VLSI chip contains the capabilities necessary for self-test, on-line fault checking, and access to all registers on the chip. Control of these capabilities is provided by an on-chip monitor (OCM) on each chip (see U.S. Pat. No. 4,488,259 by B. R. Mercy, assigned to IBM Corporation).

Access to the OCM of a chip occurs via the element maintenance bus from the ESU associated with the module. The EMB is controlled by a diagnostic maintenance device (DxMD) and is operated by the CPU on the ESU via XIO instructions. The CPU uses the EMB to cause all chips on modules under its control to self-test simultaneously during start-up of a CSP configuration. Thereafter, errors detected by a chip are reported to the ESU via the EMB; errors collected by the DxMD are reported to the local availability manager (LAM) of the ESU LOS.

In addition, a summary report of the error may be reported via the element control bus (ECB); this allows ESU LOS to associate an error with a particular operation and retry it. All error reports are eventually reported to the LAM, including those detected by on-line diagnostics. The LAM attempts to isolate an error to a single module, logs the error in the fault log on the isolated module, and reports any failure to a central availability manager located in the SSM V1750A via the PI-bus. At this level the SSM LOS can replace a failed element by reassigning all functions associated with that element to another like element if one exists.

In summary, error recovery takes several forms. In some cases, recovery actions are completely handled at the hardware level. For example, error detection and correction on global memories mask up to four errors per bank; additional power modules can be added to mask power module failure. In other cases, error recovery is handled by local retry of bus transfers and entire task operations to eliminate the effects of transient errors. Finally, error recovery through automatic reconfiguration is supported by LOS. Spare on-line modules can be populated and automatically used by the LOS in the event of failure of another module of the same type. The data network contains software-assignable alternate paths. Failures of ESU program storage and global memory storage areas can be mapped around. Backups can be associated with any centralized management functions. When CSP configuration resources have been reduced by failure to a point where the set of signal processing modes specified by the application command programs cannot executed, the application can shed load by reducing the number of signal processing modes it has concurrently active or invoke degraded (e.g. lower resolution) versions of these modes.

APPLICATION DEVELOPMENT SYSTEM

CSP is a supercomputer having many times the power of today's programmable signal processors. The challenge is to reduce code complexity while increasing processor power. To meet this challenge, CSP programmability concepts are based on three principles: high-level programming, reusable code, and an integrated application development environment.

Application command programs, executed in the V1750A CPUs, are programmed in Ada. (The trademark Ada is the property of the U.S. Government, Ada Joint Program Office.) The program that specifies the operations that functional elements must perform for a signal processing mode is programmed in high-level flow graph language.

Much code that is typically reprogrammed for each application is reusable in the CSP concept, LOS functions include the following functions which are reusable in all applications: application execution support, mode management, resource management, configuration management, communication services, availability management, error handling/recovery, timer services, system start-up, and debug. In addition, a library of microcoded functions (macros) associated with the functional elements contains common macros usable across applications.

The integrated application development system contains the tools necessary to develop, simulate, link and test programs for the three levels of programming of a CSP configuration. These levels include Ada programming for command programs, flow graph programming for signal processing modes, and microprogramming for new macros to be executed by functional elements. Simulation tools support simulation of entire modes on a CSP configuration, individual tasks, and individual macros. Load modules are downloaded to a user console which acts as the load source in development laboratory environment. Features in the user console and LOS allow debugging at each of the three levels of programming.

CSP SOFTWARE DEVELOPMENT

The increase in processor power presents challenges for software development: how can the cost and complexity of programming CSP be maintained within affordable, manageable bounds; how can the needed productivity and reliability of CSP application software be achieved.

The CSP system provides an integrated set of software capabilities based on four major principles that focus primarily on the needs of the applications programmer. These four principles are:

1. multiprocessing techniques to reduce software complexity while preserving run-time performance;
2. high order programming languages and development tools to enhance productivity and reliability;
3. a complete, integrated environment to support the total software development and maintenance life cycle;
4. support for software reliability.

These principles have led to the creation of a multiprocessing, multiprogramming CSP software architecture that includes program run-time and development environments capable of supporting all anticipated applications. A distributed operating system extends the CSP hardware to a virtual run-time machine upon which application programs execute. The user is thus not required to program a bare-metal CSP machine.

The development environment transforms application programs into operational load images, and provides facilities for off-line testing of the program components. This includes the software tools used for developing three levels of programs. One is the application command level, programmed in Ada, for the global command and control functions. Another is the graph level, programmed in CSP graph notation, for the various signal processing modes. The third is the primitives level, which involves the creation of processing macros that execute on microprogrammable functional elements such as the FPPE.

Figure 4:
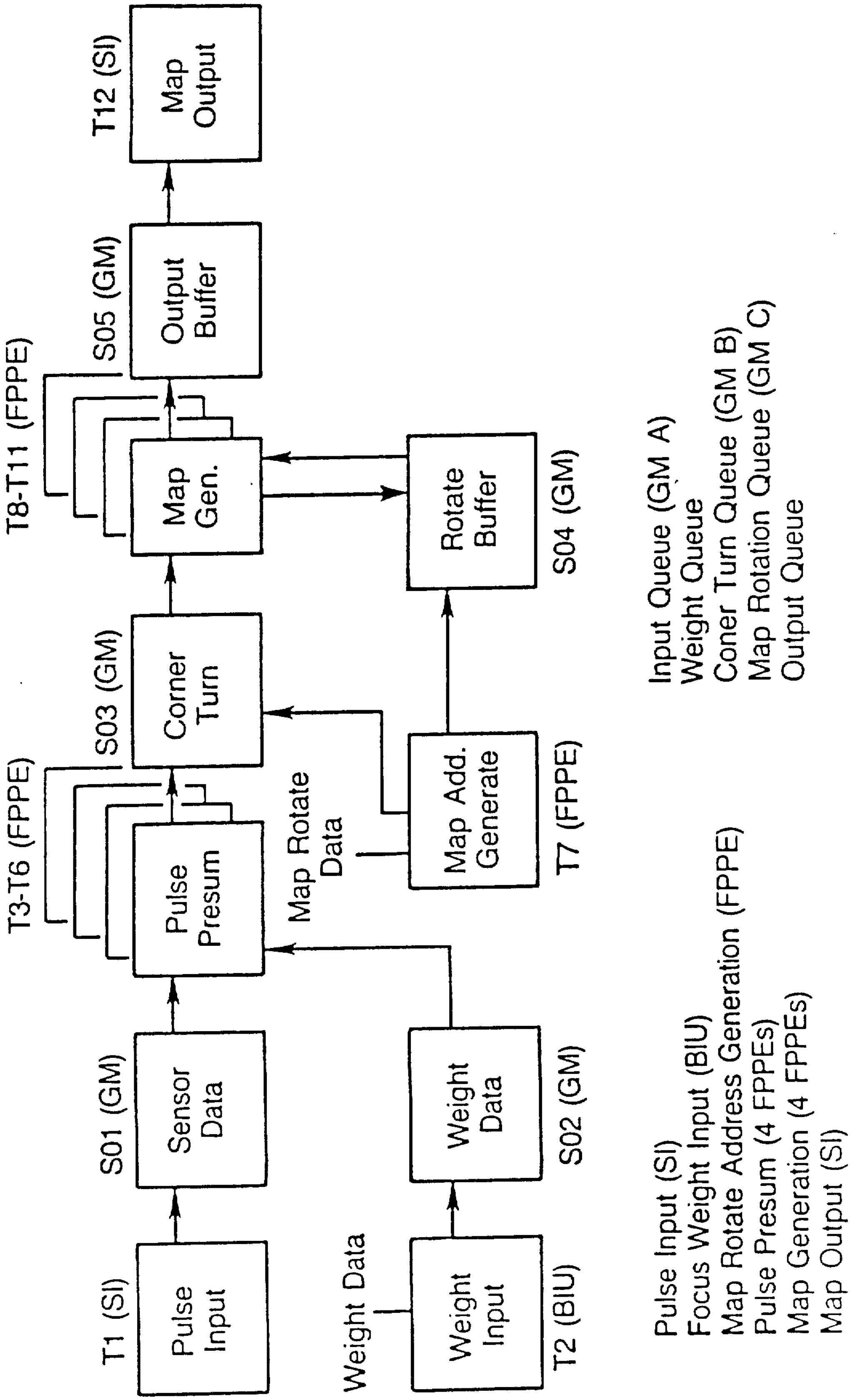
FIG. 4 shows the example SAR data flow graph.

Since the reader may not be familiar with graphical representations of data flow and even-driven computer processes, a sample graph for a spotlight synthetic aperture radar (SAR) application signal processing function is shown in FIG. 4. This graph consists of tasks (T1–T12) that transfer and process the data, and storage objects (SO1–SO5) that buffer and support manipulation of the data. The SAR graph accepts radar data and control message inputs, processes the data, and produces digital SAR map output data. This graph is described in the discussion of CSP programming language and tools.

Each of the four aforementioned application programming principles, together with the major associated CSP software capabilities, is addressed in the following discussions.

MULTIPROCESSING

A multiple processor is distributed processing system in which separate programs are written, compiled and tested for each of the processors. In a multiple processor system, application programmers are directly responsible for the detailed development of all inter-program message and synchronization interfaces, and for the step-by-step integration of the individual programs into the total system.

A multiprocessor provides capabilities that present the application programmer with a unified view of the distributed processing system. Typically, each application function that is designed to execute across multiple processing, memory and I/O elements is written, compiled, tested and configuration-managed as a single program. If dynamic reconfiguration is required, then the multiprocessor typically provides additional capabilities for dynamic run-time management of the program entities.

The underlying concept of CSP multiprocessing is that an application programmer's view of the CSP system is simplified by incorporating both run-time and support system capabilities that allocate, synchronize, manage and control the processing resources. These capabilities include support system features that allow the user to develop unified programs that execute in a distributed manner, as well as run-time hardware and operating system features that provide dynamic management, synchronization, intercommunication and control of CSP processing resources on behalf of the application programs.

The CSP local operating system (LOS) software extends the hardware architecture to create a run-time execution environment for application programs, including signal processing graphs and application command programs. The command programs are Ada programs that interface to LOS through well-defined, documented Ada interfaces. The CSP graphs are programmed in a documented CSP graph language, and are translated into control structures that execute on the virtual graph execution machine created by Los and the CSP functional elements.

The CSP approach to multiprocessing allows the user to design, code and test each distributed signal processing mode or function as a complete graph program. Thus, the programmer is freed from the necessity of having to subdivide each mode into many program segments and then having to manage all of the resulting interfaces at a detailed level. CSP multiprocessing is supported by LOS distributed graph execution functions including task scheduling, task dispatching, buffer management, event synchronization and state control. LOS also provides graph management functions that manipulate graphs as total entities, thereby enabling the programmer to manage graphs at a high level using only a relatively few, simple commands. LOS communication services support interprocessor communications among the distributed control elements.

To make a graph ready for execution at run-time, the application program has only to issue a few basic commands and a distributed instance of the graph will be downloaded from global memory to the assigned processor elements, linked and initialized. The resulting graph will execute without additional application program command interaction (although the user program must send the appropriate control messages to the relevant graph control interfaces in a timely way).

CSP graph instantiation is a dynamic resource allocation and memory overlay process that provides essential mode management and fault-tolerance capabilities. A CSP graph is partitioned off-line into a set of relocatable components called allocation units (AUs). Information is provided with the graph load image that enables LOS to assign each AU to a specific functional element, download each AU to the ESU that manages the assigned functional element, resolve addresses and pointers to link the set of AUs into an executable graph, and initialize the graph state and data buffers as specified by the graph programmer. User-defined graph constants can be specified at instantiation time to personalize each graph instance for its intended operational use.

The graph programmer can preassign AUs to specific functional elements. An enhancement allows the programmer to specify only logical assignments, in which case LOS will perform dynamic logical-to-physical mapping of SUs using resource loading and storage utilization information included with the graph load image. Fault-tolerance is supported by LOS reassignment of designated spare elements to replace failed elements. The principles of multiprocessing have been consistently employed to ensure that the application programmer is required to specify only essential graph-design information. The CSP system software provides comprehensive support for graph generation, graph execution, graph management, and fault-tolerance.

Other CSP fault-tolerance features that are related to multiprocessing include transient and hard error recovery. The graph execution and interprocessor communication functions retry graph tasks and interprocessor messages that have aborted because of errors. This retry capability automatically masks most transient or intermittent errors, which results in enhanced operational reliability. Noncorrectable errors that can be associated with specific graphs by the LOS availability management function lead to immediate suspension of the affected graphs to avoid error propagation. These graphs can then be reinstantiated using available to spare processing resources to complete the error-recovery process. The CSP multiprocessing capabilities permit each affected graph to be suspended and reinstantiated by LOS as a single entity, thus avoiding undesirable program fragmentation.

LOS graph execution performance is designed to ensure that ESU control operations can be effectively overlapped with functional element operations so that control overhead will be minimal. LOS graph-management performance is designed to permit a set of up to 10 graphs to be instantiated and enabled for execution in approximately 50 milliseconds, depending on the complexity of the graphs and the design of the application command program. This performance capability provides the dynamic mode management and fault-tolerance responsiveness needed to ensure mission effectiveness.

LOS capabilities include processor control, multiprogramming support, graph-execution support, graph management, run-time resource and configuration management, communication services, timer services, availability management, on-line diagnostics, error handling, and recovery and debug extensions. The processor control and multiprogramming support functions create an Ada multiprogramming environment for the execution of multiple command programs in a single processor. The addition of LOS communication services creates a full multiprogramming environment for command programs, and provides interfaces to the distributed ESU LOS functions for graph management and control. CSP graph multiprocessing at the execution and management levels is supported by LOS communication services, graph execution, graph management, and resource management.

The Ada interface commands (FIG. 5) are used by application command programs to invoke various LOS services, to modify system parameters and to define entry points for LOS responses and reports.

Figure 6:
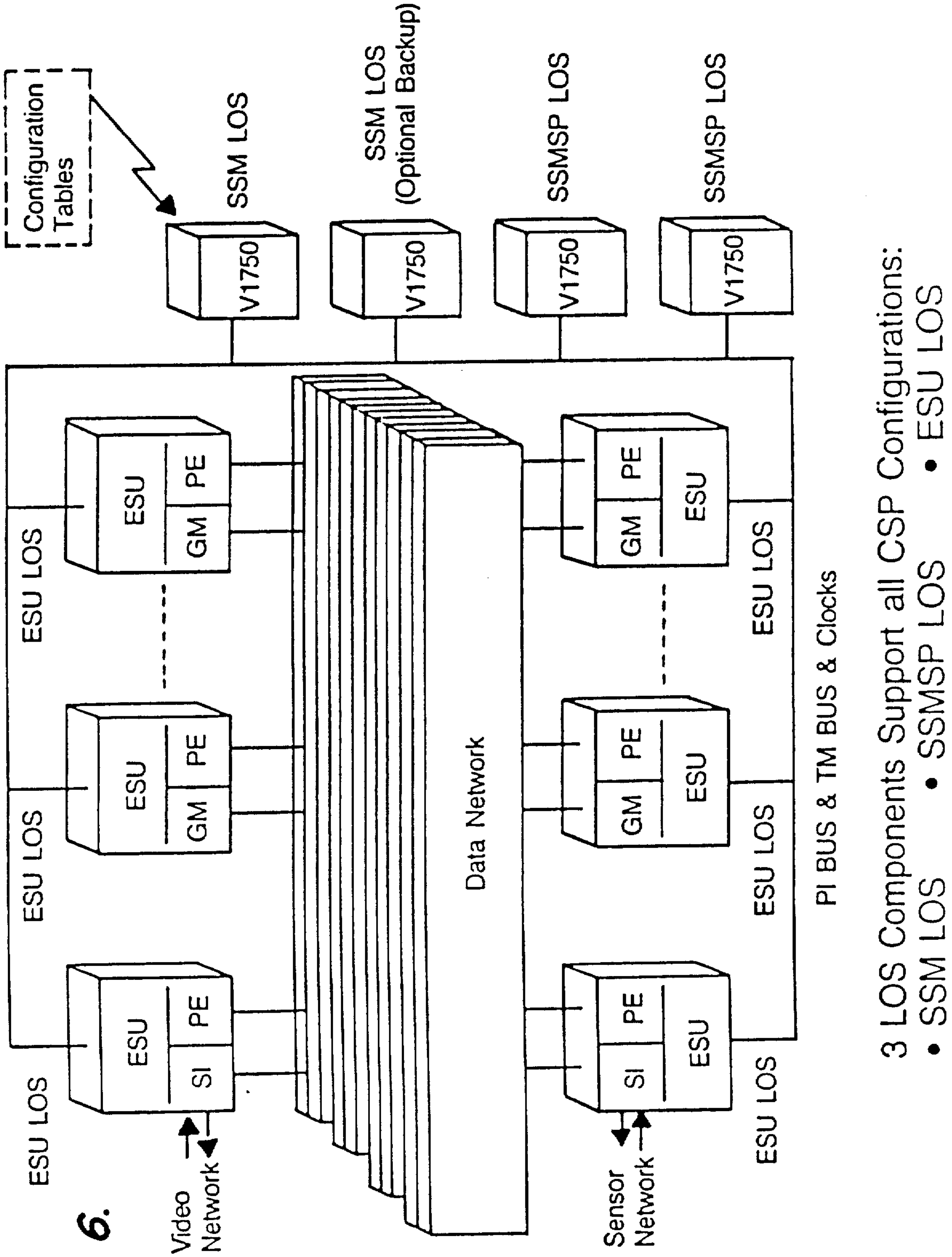
FIG. 6 shows the local operating system configuration.

The distributed LOS functions are organized into three software components (FIG. 6). The subsystem manager (SSM), the subsystem manager support processor (SSMSP), the ESU LOS components support all valid CSP configurations. The same ESU LOS component executes in every ESU, regardless of attached functional elements. The SSM support element processor executes a load image consisting of the SSM LOS component linked with one or more application command programs. Centralized graph management, resource management and availability management functions are contained in the SSM LOS component. Optionally, a second copy of the SSM load image, including the application command programs, can be executed as backup in a spare support element processor. Fault-tolerant switchover to the backup SSM will occur under LOS control with no loss of run-time state if the primary SSM fails. If the SSM is not capable of supporting the entire application command program processing load, then a subset of SSM LOS, the SSMSP LOS component, provides operating system capabilities for one or more additional support element processors.

LOS is designed to be self-configuring so that modifications are not needed to support each unique CSP configuration. A hardware configuration table is linked with the SSM LOS component and utilized by the central resource management functions. During LOS initialization, electronic nameplates are accessed from non-volatile memories on each CSP element to determine the actual configuration. This is compared with the configuration table to ensure that the application programs and the CSP configuration are compatible. The configuration table is also used for maintenance of the run-time availability status of CSP elements.

PROGRAMMING LANGUAGES AND TOOLS

Ada is the programming language for CSP application command programs. A special graph language is used for the programming of CSP graphs. Each language has specific features and capabilities that are appropriate to the intended CSP usage. Both languages and programming environments, however, have similar attributes and characteristics that support software productivity and reliability.

The well-defined structure of Ada programs strongly encourages a top-down, structured design approach to modular software development. The language constructs provide a complete, powerful set of program control capabilities; unneeded constructs that encourage convoluted program organization are avoided. The Ada requirements for strong typing of data structures and detailed specification of interfaces cause the programmer to specify explicitly the intended attributes of program elements and permit the compiler to discover many common programming errors.

The Ada run-time environment provides reusable software capabilities including program supervision, processor resource management, and language feature support. Thus, a consistent high-level target environment is established for the program generation tools. The run-time target for CSP command programs is an Ada multiprogramming environment in which several Ada programs share a single processor and execute under the control of the Ada multiprogramming executive. The use of two or more support element processors intercommunicating via LOS communication services provides a highly flexible multiprogramming CSP command program environment for large applications.

CSP graph notation is an object-oriented, block-structure language that shares with Ada the concepts of highly-structured programs, well-defined language constructs, strong typing, detailed interface specification, and a virtual run-time target environment for program execution. These language concepts and the associated program-generation tool capabilities provide essential productivity and reliability support for CSP graph development. FIG. 7 shows the top-level graph notation for the SAR graph in FIG. 4.

The fundamental elements of a CSP graph program are the functional element primitive capabilities. A primitive operation is specified by a graph notation statement that includes an appropriate verb. Read and write operations specify hardware primitives that involve remote data transfers via the data network, or local transfers between ESU buffers and functional element memories. Primitive operations of microprogrammable functional elements called FE macros, as well as GPPE graph task calls, are specified as execute operations. External data transfers involving functional I/O elements (e.g., SIs) are hardware primitives that are specified as input or output operations. An access statement specifies an addressing mode and the associated parameters for a global memory access operation.

A sequence of primitive operations that is dispatched to a functional element for non-preemptable executive is referred to as a subtask. The structure of a subtask must be consistent with the capabilities of the associated functional element. Subtasks are relatively simple program segments that may, in some cases, include unconditional or conditional branching operations.

A schedulable unit of work, referred to as a task, includes one or more subtask executions to be performed by a single functional element. Each subtask performs the same processing operations on a different data set. All data transfer and data processing functions in a CSP graph are programmed as task operations. Task scheduling is event-driven, and is controlled by means of synchronizing tokens that represent event occurrences. Data-flow events signify the availability of input data for a task, or the availability of output buffer space for the task results. Non-data-flow events that may be used for task scheduling include timing events, triggers that indicate the occurrence of data-dependent conditions, triggers issued by a command program, or task-control update messages. FIG. 8 shows the graph notation for one of the SAR graph tasks.

Figures 9, 10:
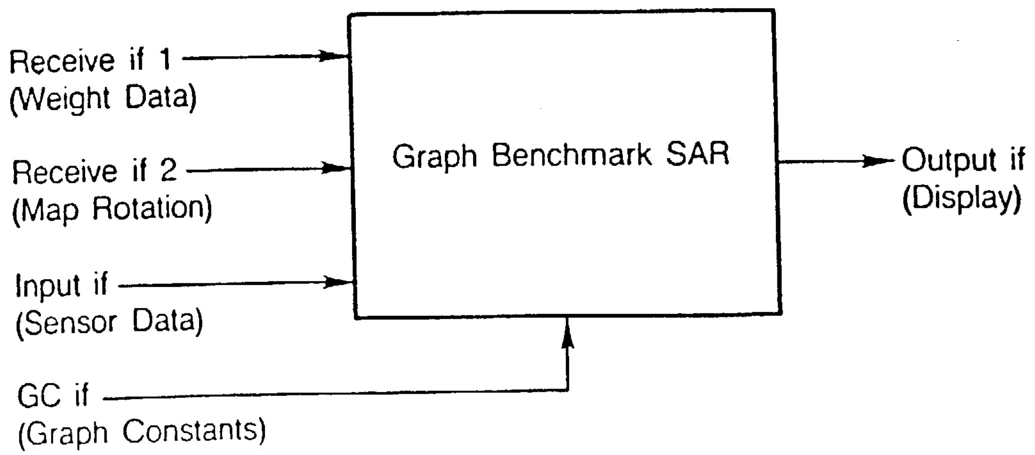
FIG. 9 shows the storage object specification, using CSP graph notation.
FIG. 10 shows the benchmark SAR graph external interfaces.

Data structures in global memory are called storage objects. Dynamic storage objects are two-dimensional queue structures with head and tail pointers. The states of these queue-type storage objects are managed by LOS, including the pointers, access-port addressing parameters, and synchronizing tokens. Static storage objects are data buffers that are accessed by task read/write operations with specified offsets. There is no dynamic LOS management of buffer-type storage objects; graphic instantiation and termination, however, include allocation and deallocation of memory resources for both types of storage objects. FIG. 9 shows the graph notation for one of the SAR graph storage objects.

Other objects that are specified within a CSP graph program include local buffers, graph variables, and graph constants. Local buffer objects are located in ESU program storage or in a functional element memory. Graph constants and graph variables are used in parameter update records for graph tasks or storage objects. Graph constants are specified by a command program during graph instantiation to personalize the graph for its intended use. Graph variable updates are provided by a command program during graph execution for dynamic modification of graph object parameters.

Graph tasks and storage objects have specified interfaces. A receive interface is used to accept a control or data message. A send interface is used to send a message upon completion of a graph task execution. A task interface is associated with each read/write and input/output operation. Also, each storage object access port has an associated interface. The graph itself has specified external interfaces. The graph topology is defined by a set of connect statements, each of which specifies the interconnection of two defined interfaces.

The topology of the SAR graph in FIG. 4 includes several typical types of graph tasks and storage objects. The pulse input and map output tasks are SI input and output tasks, respectively. The pulse presum, map generation and map address generate tasks are FPPE processing tasks. Storage objects assigned to GMs include the sensor data queue, the corner turn buffer, the output buffer, the weight data queue, and the map rotation buffer. The weight input function is a GM task that receives aircraft motion compensation data from the command program and transfers it to the weight data queue.

The SAR graph external interfaces (FIG. 10) include two receive interfaces for command program motion compensation and map rotation control, the sensor-data input and map data output interfaces, and a graph constant interface for specification of the SAR map dimension and resolution parameters. This black box representation of the SAR graph, including detailed specifications of the interface data structures and message formats, illustrates the external graph specification that is used by the command program designer. The internal features of the graph are primarily the concern of the graph programmer.

THE GRAPH TRANSLATOR INVENTION

The graph translator is a key tool to automate the process of developing graph software. The graph translator accepts a graph program written in CSP graph notation and generates the graph object structures that execute in the run-time environment. Cost-effective graph programming productivity results from the use of high-level statements, symbolic references, and well-defined program structures. Graph program reliability is significantly enhanced by the extensive syntax parsing and semantic checking performed by the graph translator.

All graph objects, including graph tasks, storage objects, buffers, graph variables and graph constants, have attributes that are specified by the graph programmer. These attributes are used by the graph translator to ensure that the CSP graph semantic rules are satisfied, including parameter and data type checking and buffer-usage checking.

Graph interconnections are governed by graph program syntax and semantic rules. Graph task and storage object interfaces have defined attributes that are used by the graph translator to verify the validity of specified interconnections. Completeness checks are performed to ensure that all object interfaces are connected either to other object interfaces or to external graph interfaces.

Multiple CSP graphs can be simultaneously instantiated and enabled for execution at run-time. Each graph executes in response to data or event tokens received via its external interfaces. Typically, a command program controls the sensor or other external data sources to schedule inputting of signal data to each graph, and then sends control information to the graph control interfaces. The determination of whether graphs execute singly or concurrently is a function of the run-time scheduling of external data to the graphs. Because simultaneous graph instantiation and concurrent graph execution are dynamic run-time considerations, off-line graph programming is primarily concerned with the development of individual graphs. This results in a further reduction in application software integration complexity.

INTEGRATED SOFTWARE DEVELOPMENT ENVIRONMENT

The CSP development environment has been designed to furnish the application programmer with a complete and integrated set of softwares tools. These tools provide capabilities necessary for translating, linking, simulating, testing and debugging CSP application programs at all three programming levels. Together, they enable the programmer to develop programs effectively to run on a complex distributed system and also to optimize those programs so that they run efficiently.

Figure 11:
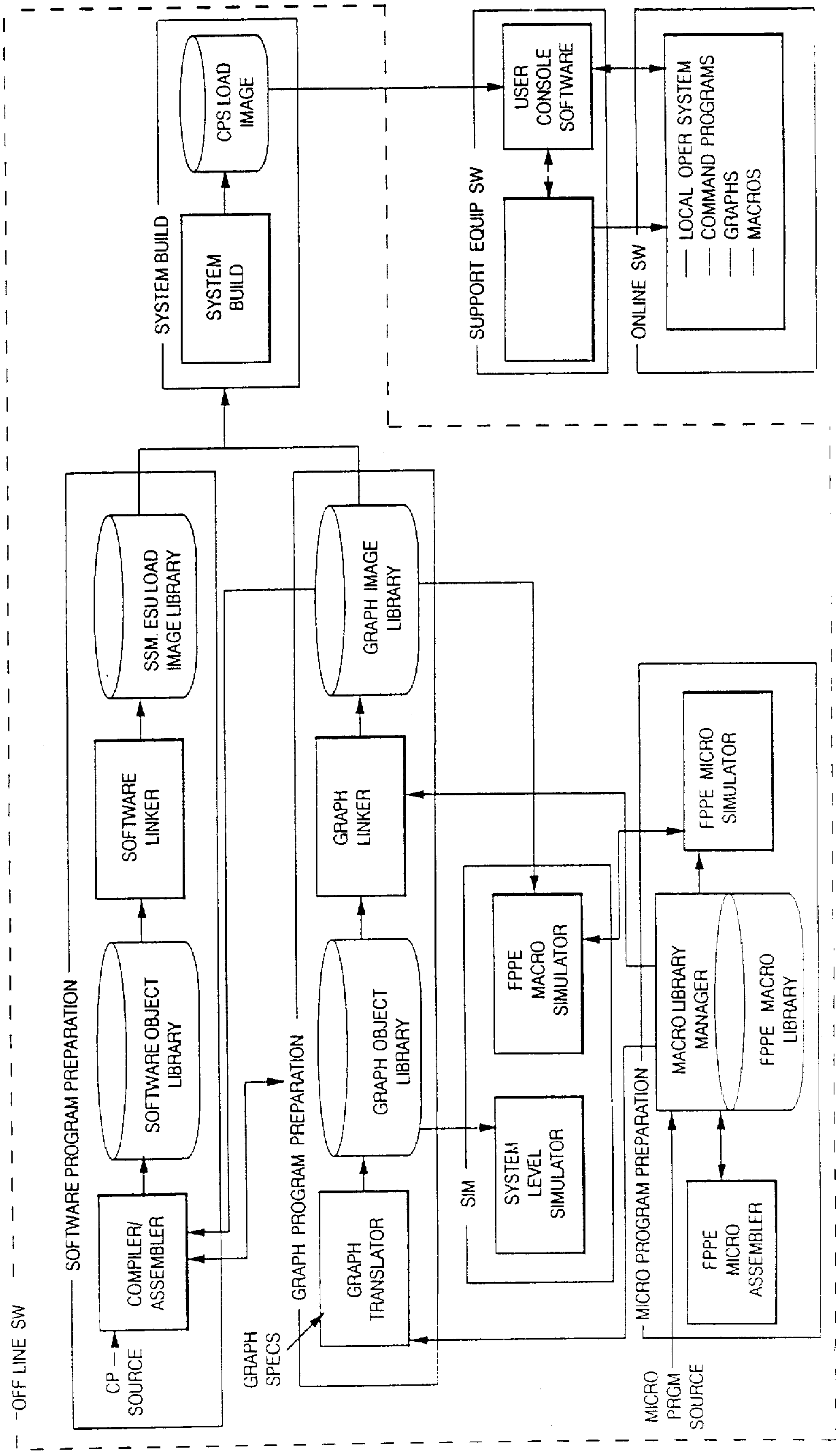
FIG. 11 shows the CSP software development system.

As illustrated in FIG. 11, the CSP development environment includes program generation tools for command programs, CSP graphs, and FPPE macros. Graph-related simulators include the system level simulator and a FPPE macro simulator. The generation system software includes a system builder that accepts object code from the CSP graph linker or the command program linker and generates the machine loadable images. The user console supports downloading, test and debug of CSP software and firmware. A CSP support-equipment simulator is also available for laboratory implementation of a simulated CSP avionics system environment.

A complete application-command-program preparation system is available for CSP, including an Ada compiler with debug support and an integrated tool set consisting of an assembler, a simulator and a linker. The graph-preparation capability includes a graph translator and a graph linker. The graph translator generates object structures and tables for individual CSP graphs. The graph linker builds microstore and coefficient store load images for microprogrammable CSP functional elements, based on graph translator outputs for the complete set of application graphs.

A primitive/macro development language, assembler and simulator are provided for the microprogrammable FPPE. A macro string simulator is also provided for the FPPE, to support unit testing of FPPE graph tasks or subtasks. A similar set of microcode tools will be provided for the VSPE and other microprogrammable processing elements as they are added to the CSP architecture.

The CSP system level simulator (SLS) is a unique graph development tool that perhaps best illustrates the significance of the fully integrated CSP run-time and development support capability. The SLS provides an accurate, event-level simulation of one or more CSP graphs executing in the run-time environment. This capability requires that the SLS accept graph translator outputs, emulate run-time graph instantiation functions, accept simulated command program interactions in the form of an event scenario file, and accurately simulate the functionality and timing of the virtual graph execution machine.

The SLS does not simulate the actual processing of the data. Rather, it simulates the execution times and resource contentions of the CSP virtual graph execution machine, so that the element loading factors, bandwidth utilizations, processing latencies, and overheads associated with execution of one or more graph programs can be analyzed off-line. The SLS outputs consist of CSP resource usage reports which include: ESU CPU and memory use; interprocessor bus and data network loading and contention statistics; functional element task executions, idle times and task priority effects, and event time-line traces for each CSP element.

Figure 12:
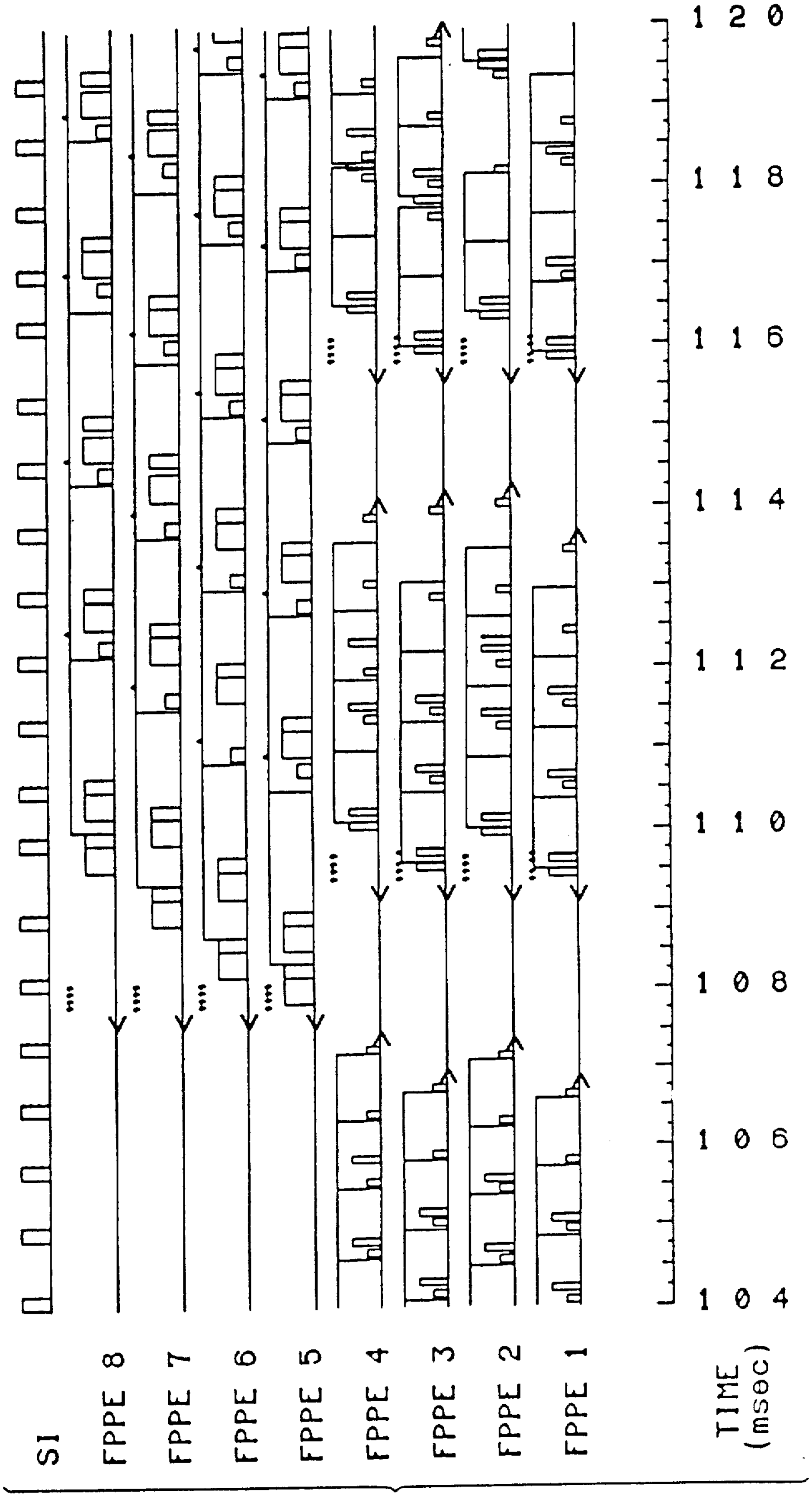
FIG. 12 shows the system level time-lines for benchmark SAR graph.

FIG. 12 shows a portion of the event time-line traces for the previously described SAR graph of FIG. 4. The SI time-line shows the pulse input data transfers to the GM sensor data buffer. Four of the FPPE time-lines show pulse presum task executions, and the remaining four show map generation task executions. Task scheduling, subtask dispatching and task completion events are indicated by the symbols (<), (') and (>), respectively. The multiple bars show subtask execution intervals, data reads and data writes, largest to smallest, respectively. Careful examination of the time-line traces and other SLS outputs reveals occasional brief intervals of GM memory contention that result in FPPE processing delays. Most of the time intervals during which the FPPEs are not busy, however, are found to be idle times that are available for execution of other concurrent graph tasks.

The value of the SLS is that it enhances programmer productivity by providing a cost-effective alternative to the tedious and time-consuming process of analyzing the performance of graph programs on the actual machine to determine whether the run-time requirements have been satisfied. Thus, the programmer can efficiently identify resource contention problems that are related to the way in which the various graph tasks and storage objects have been organized and assigned. With the SLS, each graph design can be iterated until the run-time objectives have been satisfied. The SLS capability is essential for the management of critical processing latencies and the efficient utilization of CSP processing resources.

SOFTWARE REUSABILITY

Software reusability occurs at three levels in the CSP development system. First reusable Ada software packages are possible as a consequence of Ada having been adopted as the application command programming language. A previously developed and tested Ada package consisting of a well-defined interface specification and a package body can be included in an application command program.

Second, a similar reusability capability exists at the CSP graph level. A previously developed subgraph with its interface specification, object declarations and subgraph body can be included in a CSP graph and interconnected to other graph objects.

Finally, there is reusability at the functional element primitive level for FPPE microprograms, initially, and for other functional element microprograms eventually. These generic, parameterized routines typically perform commonly used signal and data processing functions. The microprograms, together with their interface specifications, are collected into macro libraries to be used by CSP graph programmers.

The macro interface specification is the key to automatic integration of the CSP macro library with the graph translator and graph linker tools. An interface specification is written for each macro in a special macro attributes notation. It provides the information needed by the graph translator to parse the macro execute statement whenever it occurs in a graph program. The macro interface specification includes semantic assertions for testing the macro parameter attributes and value ranges specified by the user. It also provides rules for generating the run-time macro control structure. Thus, once a microprogrammed primitive and its interface specification have been included in the macro library, that macro is available to be used in any future graph program with minimal effort.

DETAILED DESCRIPTION OF THE INVENTION

The invention disclosed herein is a compiler for a data flow architecture. The term graph translator will be used interchangeably herein for such a compiler. The term graph translator comes from the original mathematical concept of connected graphs as a representation of a data flow wherein a circle representing a function will be connected by an arrow to other circles representing other functions, the topology of which is the overall structure of a complex function to be programmed. The compiler for data flow architecture invention is a graph translator in this regard, since the invention enables a programmer to represent a specific complex logic function to be programmed, as an arrangement of component subprocesses called tasks. Each component subprocess or task will be executed on a separate one of the processing elements in the distributed processing network. Some of the features of the graph translator invention disclosed herein include the ability to represent the task to be performed on a particular data processing element in the form of a control block. The compiler prepares the control blocks from user defined task descriptions in the form of high level language instructions which specifies what the task does, which other tasks a given task is associated with, and on what data processing element a given task is to be executed. The control blocks are of three different types, a first type for controlling the execution of tasks within a particular data processing element, a second type for controlling the transfer of data between tasks, and a third type for controlling interdependent tasks by sending control tokens between tasks.

Figure 13D:
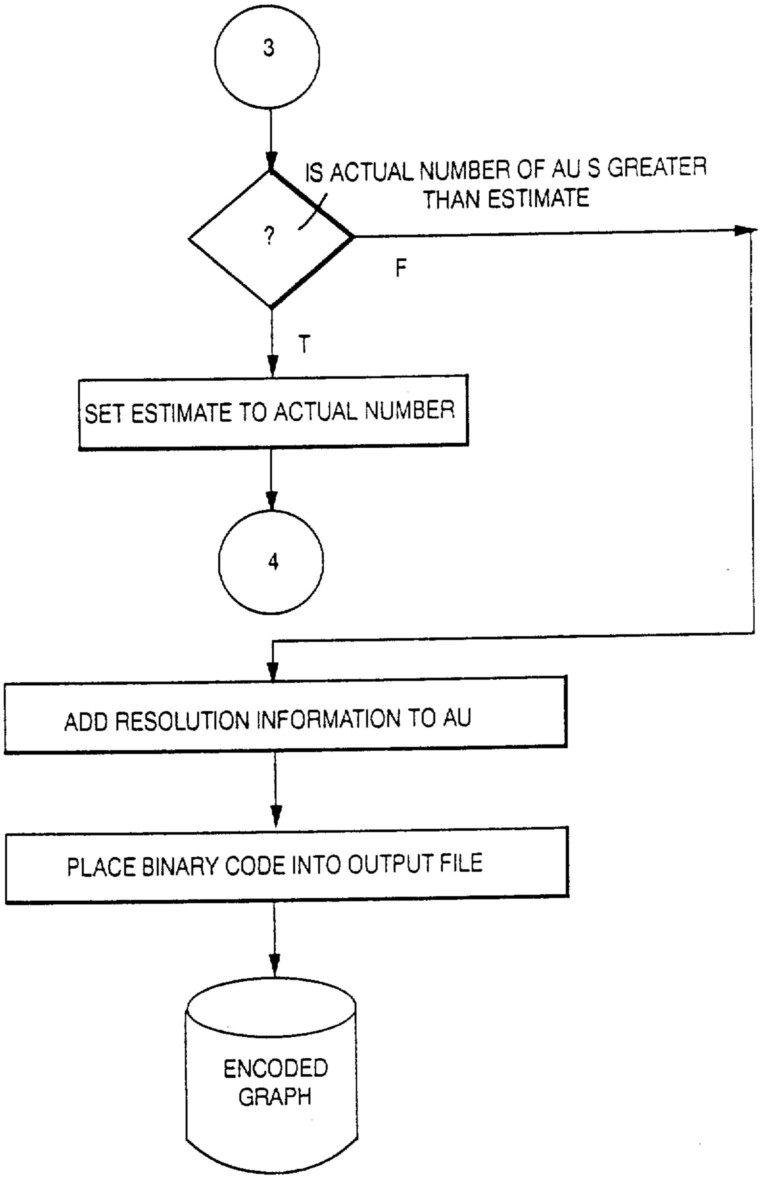
FIG. 13 is a flow diagram of the compiler for a data flow architecture invention which consists of FIG. 13A which shows the post/wait mask generation, FIG. 13B which shows the control block generation, FIG. 13C which shows the allocation to AU, and FIG. 13D which shows the resolution generation and output.
Figure 13:
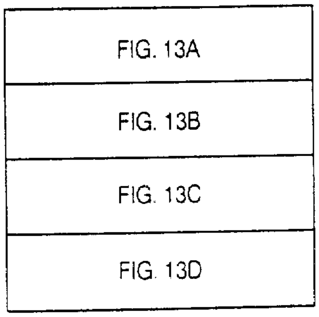
Figure 13A:
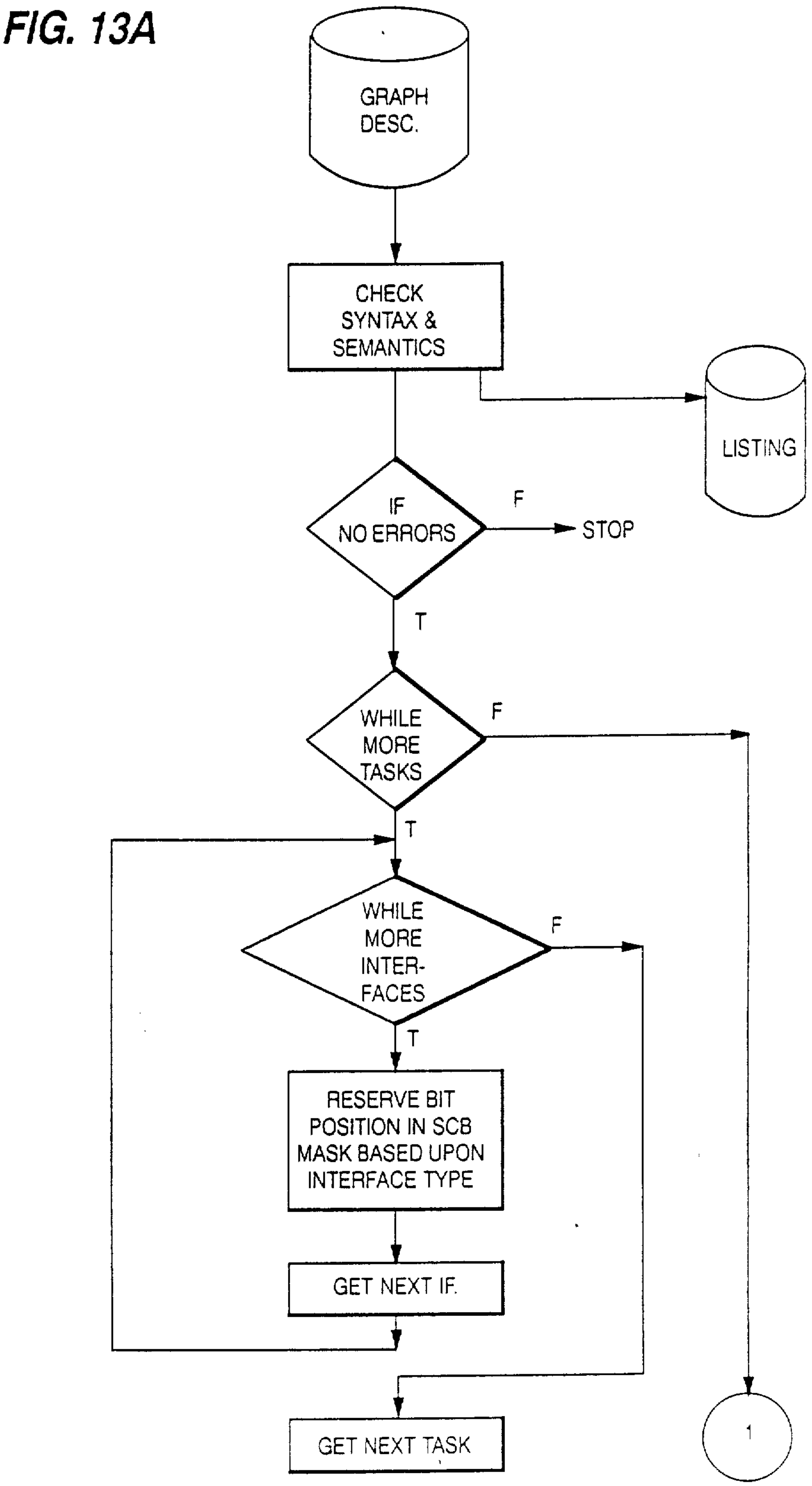
Figure 13B:
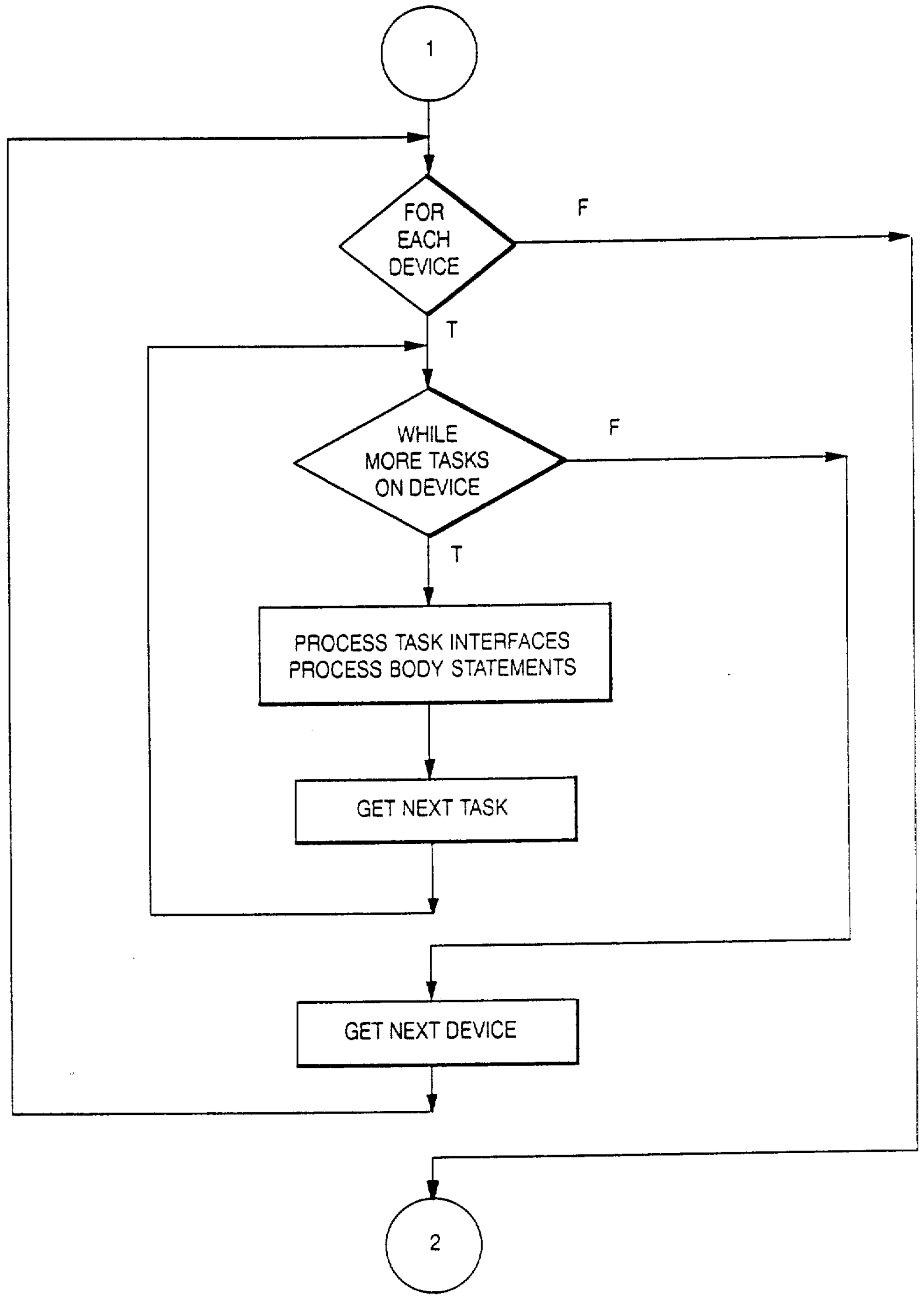
Figure 13C:
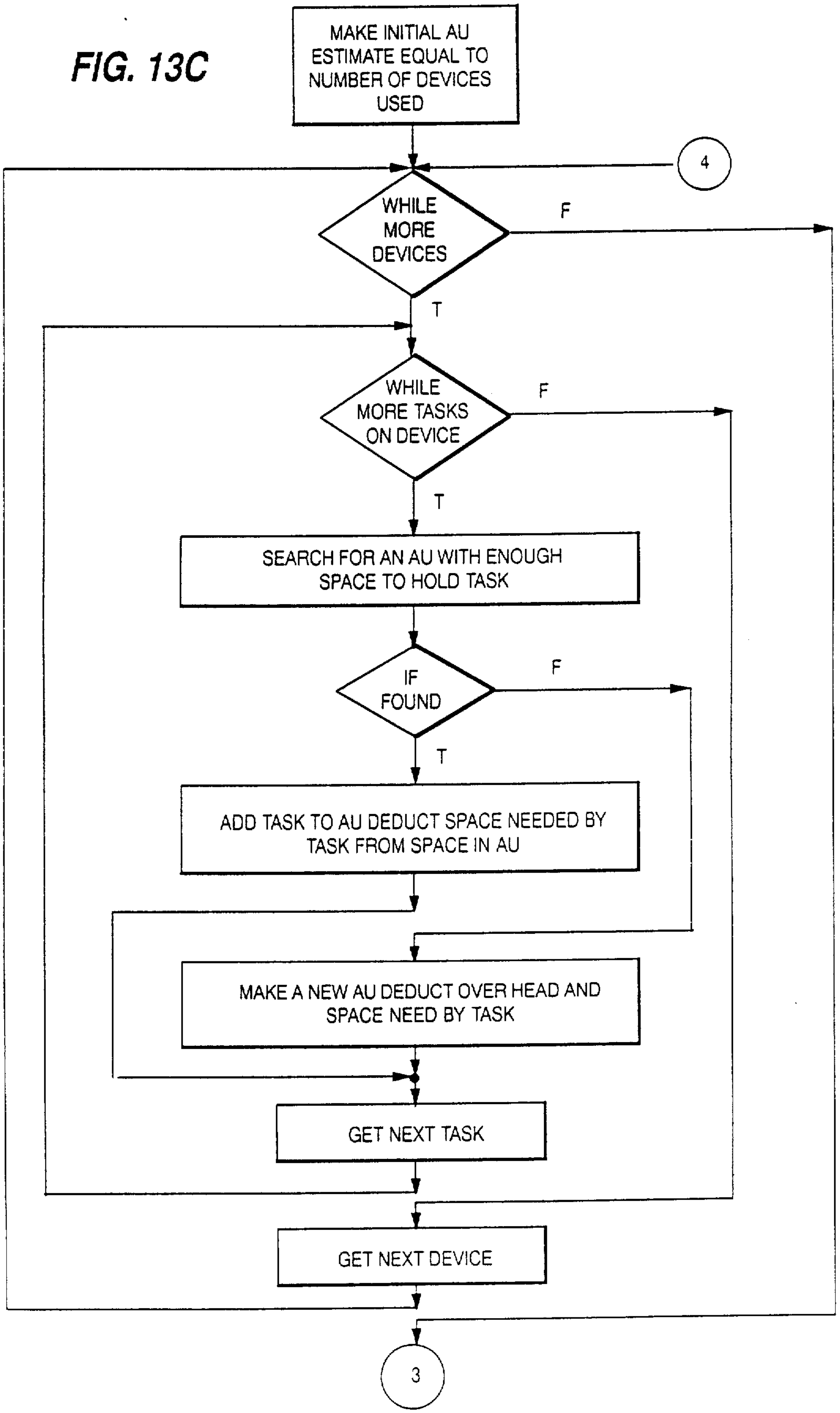

FIG. 13 is a flow diagram of the graph translator invention. Converting graph notation into the LOS and hardware control blocks needed for graph instantiation and execution is done as follows:

a. Read in the user created graph description. Check the graph notation for syntactic and semantic correctness. If errors are not detected then proceed with the following steps. If any errors are detected report them to the user and stop processing.
b. For each object defined in the graph description create the non-resolution control blocks which are needed. The procedure is as follows:
   1. Create the token controlled post/wait mask.
   2. Process all of the object's interconnections to determine the token mask for the object and the token position for the interface. Each token controlled interface on an object will reserve a bit position in the object's token mask. The positions can be assigned in any arbitrary order as long as each interface is unique and positions reserved for the operating system or hardware are not used. If more positions are needed than are available, then generate an error message.
   3. The token position for each interface is saved so that the interface which is connected to the current interface will know what token position is to be set when the appropriate conditions have been met.
   4. The token mask is saved for insertion in the appropriate control blocks.
c. Create the token controlled post/wait posting mechanism. After the post/wait masks have been created, process the interfaces for each object. If the interface is a token controlled interface, then create a hardware send token control block (a BCB parameter write) which will set the appropriate token position in the token mask of the object which contains the interface to which the current interface is connected.
d. Create the hardware and operating system control blocks for the object.
   1. Each high level language statement in the graph notation correspond to zero, one or more software or hardware control blocks. This mapping is defined later in this description. The following applies to all control blocks which are created. As each statement is processed the desired control blocks are created and filled in. If a control block references another control block either via an address or a communication path, then this interconnection is recorded. If the control block being referenced has already been defined, then the symbolic label which represents the location of the control block being referenced is placed into the current control block. If the control block being referenced has not been defined, then a symbolic label is assigned to the control block being referenced. This symbolic label is referenced by the current control block and will have its value defined by the referenced control block. Any labels which will be or have been referenced and are locations in the current control block, are defined.
e. After all objects have had their control blocks created the objects will be assigned to an allocation unit (AU). An AU is the smallest relocatable entity known to the operating system. Multiple objects may be grouped into the same AU if the following rules are not broken. They are if the objects have been assigned to the same device, and if the AU does not become larger than the maximum AU size.
   The procedure for assigning an object into an AU is as follows:
   1. Group all objects which have been assigned to the same device into list.
   2. Sort the list so that the objects which use the most space are first in the list.
   3. For the initial number of AUs estimated, assume that one AU is needed for each unique device.
   4. Calculate the AU overhead. The AU overhead is know AU header space plus the number of AU dependent header space times the estimated number of AUs.
   5. Assign the objects to AU as follows:
      a. Using the size of the current object, find the first AU which is on the same device and has enough available space to hold it. If no AU meets the requirements, then create a new AU and subtract the AU overhead size from the new AU available space. Place the object into the AU which was found or the new one created. Subtract the size of the object from the available space in the AU.
      b. Repeat until all objects have been assigned.
   6. If more AUs were used than the estimated number of AUs, then recalculate the AU overhead using the number of AUs that were needed and repeat the previous step (assigning objects to AUs) followed by this step. If the number of AUs used is less than or equal to the estimated number of AUs needed, then AU assignment has been completed.
f. After the objects have been assigned to AUs, the resolution control blocks needed to make the AUs relocatable will be placed into the AU. The resolution information is calculated based upon the control block interconnection information saved when the control blocks were being created.
g. After the resolution control blocks have been created all symbolic labels are replaced with the value of the actual location of the control block which the label represents.
h. Output the binary stream which is the result of the previous processing.

Figure 14:
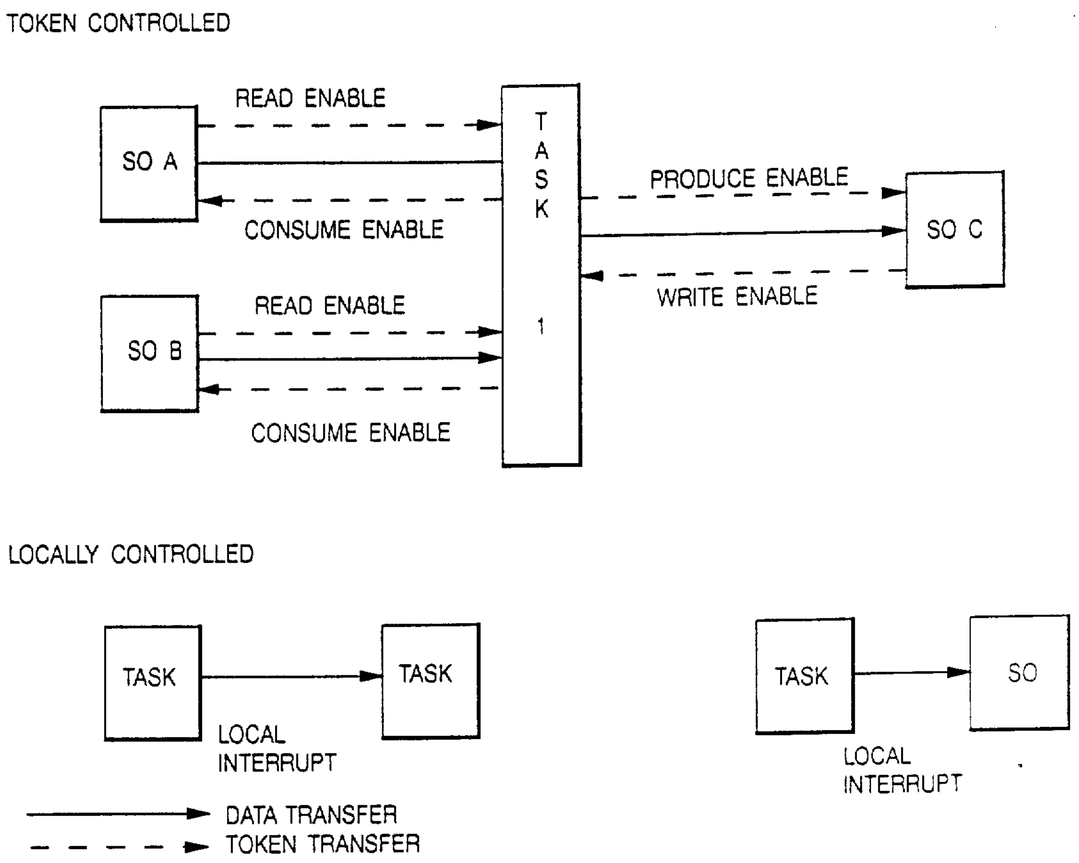
FIG. 14 is a schematic diagram of an example of token control in accordance with the invention.

FIG. 14 is a schematic diagram of a token control post and wait mechanism as established by the graph translator invention. FIG. 14 shows a task 1 which must obtain interdependent data from storage object (SO) A and storage object B, perform its processing operations and then exchange that information with storage object C. In order to carry this out with a post and wait operation, tokens are exchanged to indicate the completion of tasks which are necessary for subsequent tasks to be performed in other processors.

Figure 15:
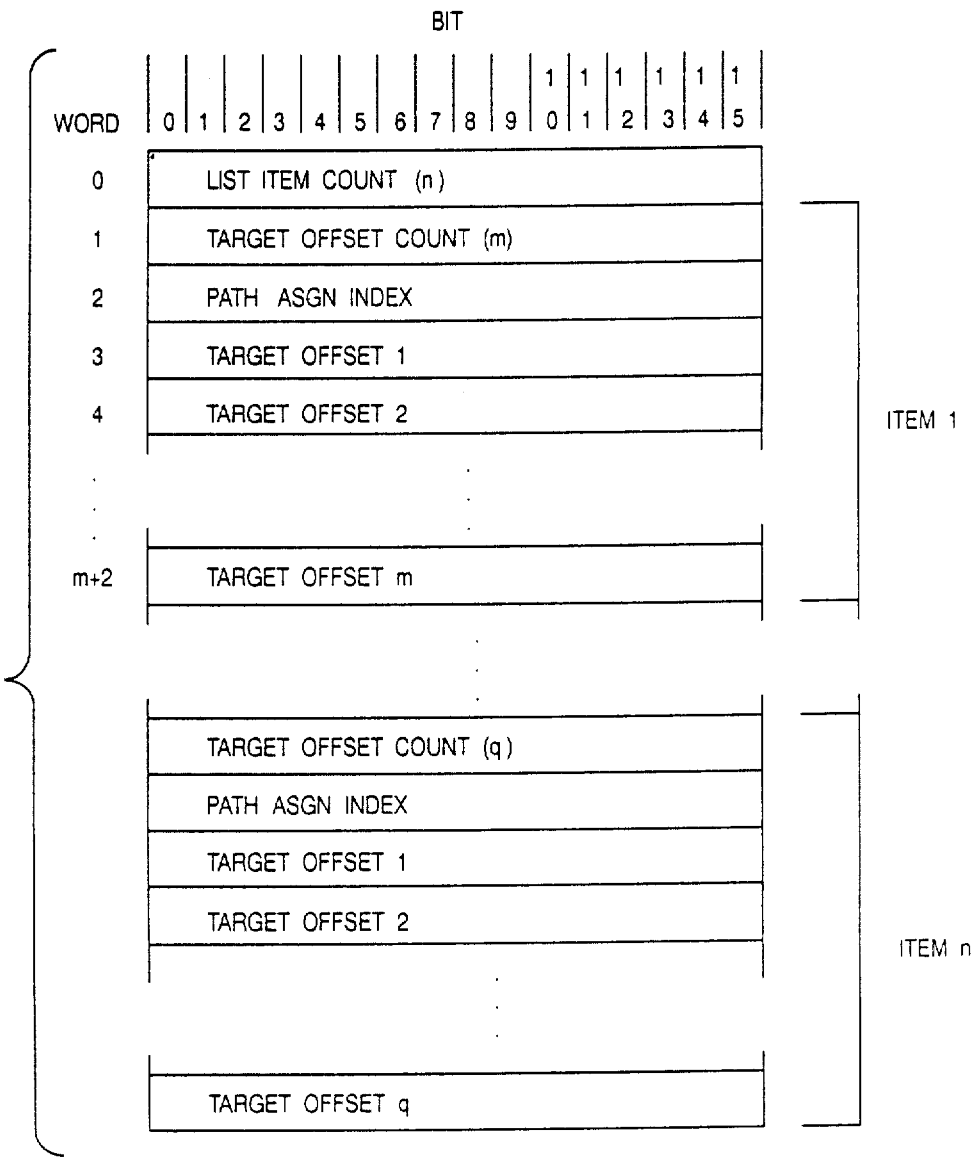
FIG. 15 is an example of a resolution control block which relates the location of other control blocks when the tasks they correspond to are reassigned from a first to a second data processing element.

FIG. 15 is an example of one type of resolution for relating the location of control blocks. A master control block shown in FIG. 15 tells the local operating system (LOS) for a particular data processing element, where the control blocks are located for a particular task which is assigned to that data processing element. The contents of the master control block is a set of vector addresses which tells the local operating system how to modify the contents of a local control block is reflect the relationship and locations of other control blocks within the distributed system for other tasks executed on other ones of the data processing elements in the network. The example shown in FIG. 15 keeps track of data paths in the network. Other types of master control blocks will keep track of the location of associated storage elements, addresses of other control blocks, and other information necessary to enable a coordinated operation of the various distributed processing elements in the network.

1 LANGUAGE TO CONTROL BLOCK CONVERSION.

The translation of a language to a set of control blocks requires the definition of the language, the definition of the output, and a set of procedures to perform the translation.

1.1 Mini-language. The language used by the CSP project is quit large since it must support many types of hardware and runtime software. For the purpose of this disclosure a smaller, yet representative, language is used to describe the translation process. This smaller language will be referred to as the mini-language. Examples of this invention show later in this document shows the actual language being used. At the end of this discussions possible language extensions are given.

The following mini-language discussion assumes a reasonable knowledge of compiler terms. Some minor semantic rules have been left out of this description since they are implementation dependent. The mini-language consists of three section. The first section is the Graph Interface. This section describes the interface between this graph and other graphs or application command programs. The second section is the generic job description. This section describes the generic type of job to perform and the interfaces to that job. The final section is the topographical description. This section defines actual instances of generic jobs, the interconnection of these jobs to other jobs or the graph interface and the assignment of these jobs to physical devices.

```
<graph>  :==  GRAPH <name>
              INTERFACE <interface_section>
              DECLARE <generic_job_description>
              BEGIN
                <topographical_description>
              END
```

The interface section contains six types of interfaces. The six types of interfaces fall into two categories. The first category are interfaces which access the Data Transfer Network (DTN). The second category access the PI Bus.

There are four interfaces to the DTN. The produce interface (produce_if) controls the addition of data to a storage object. The consume Interface (consume_if) controls the removal of data from a storage object. The read interface (read_if) controls the transfer of data into a task. The write interface (write_if) controls the transfer of data out of a task.

There are two interfaces to the PI Bus. The Send interface (send_if) transfers a data out of a task's PS_Buffer specified by buffer_<name>. The receive interface (receive_if) transfers data into a task's PS_Buffer specifed by buffer_<name>.

```
<interface_section>   :==   <interface_section> <interface> |
                            nothing
<interface>           :==   PRODUCE_IF <name> |
                            CONSUME_IF <name> |
                            READ_IF <name> |
                            WRITE_IF <name> |
                            SEND_IF <name> , buffer_<name> |
                            RECEIVE_IF <name> , buffer_<name>
```

The generic job description section defines generic tasks of storage objects which, if referenced in the topology section, will be converted into hardware and software control blocks.

```
<generic_job_description>   :==   <generic_job_description> <job> |
                                  <job>
<job> :== <task> | <storage_object>
```

The task contains three sections. The first section is the task interface. This section is the same as the graph interface section except that Produce_IF and Consume_IF are not allowed. The second section is the buffer declaration sections. The third section is the task function section.

```
<task>   :==   TASK <name>
               INTERFACE <interface_section>
               BUFFER <buffer_declarations>
               BEGIN
               <task_function>
               END
```

The buffer declaration section allows the deceleration of buffers which will reside in ESU mapped memory (PS_BUFFER) or the processing element mapped memory (LS_BUFFER). The buffer declaration will allow the size of the buffer to be defined.

```
<buffer_declerations>   :==   <buffer_decelerations> <buffer> |
                              <buffer>
<buffer>                :==   PS_BUFFER <name> , <expression> |
                              LS_BUFFER <name> , <expression>
```

The task function section section defines the data transfers and data manipulations to be performed. Two types of data transfers (Read and Write) and one form of data manipulation (Execute) will be allowed.

```
<task_function>   :==   <task_function> <stmt> |
                        <stmt>
<stmt>            :==   <read> |
                        <write> |
                        <execute>
```

The read statement controls the transfer of data from a read_if or PS_buffer to a second buffer. In addition to the source and the target buffer the number of words to transfer is supplied

```
<read>   :==   READ   source_<name> ,
                      target_<name> ,
                      amount_<expression>
```

The write statement controls the transfer of data from a buffer to a write_IF or PS_buffer. In addition to the source and the target buffer the number of words to transfer is supplied.

```
<write>   :==   WRITE   source__<name> ,
                        target__<name> ,
                        amount__<expression>
```

The execute statement gives commands to the data processing device which this task controls. The parameters to the command varies according to the type of device.

```
<execute> :== EXECUTE command__<name> <parameters>
```

The Storage Object (SO) contains three sections. The first section is the SO interface. This section is the same as the graph interface section except that only Produce_IF and Consume_IF are allowed. The second section is the SO attributes sections. The third section is the SO function section.

```
<storage_object> :==
        STORAGE_OBJECT <name>
        INTERFACE <interface_section>
        ATTRIBUTES <attribute_declarations>
        BEGIN
          <so_function>
        END
```

The attribute declarations describe the amount of data to reserve the Global Memory for the storage object. When all of the tasks writing to a produce_if have completed the "amount of data counter" in the storage object is increased by the produce_amount via LOS. When all of the tasks reading from a consume_if have completed the "amount of data counter" in the storage object is decreased by the consume_amount via LOS.

```
<attribute_declarations> :== number _of_rows_<expression> ,
                             number_of_cols_<expression> ,
                             produce_amount_<expression> ,
                             consume_amount_<expression>
```

The SO function section maps the interfaces supplied in the interface section to the GM storage area defined in the attribute declaration section. A threshold value is also supplied. If defining a produce_if the threshold indicates how large a value in the "amount of data counter" must be before the tasks connected to the produce_if may execute. If defining a consume_if the threshold indicates how large the value "total space''—"amount of data counter" must be before the task connected to the consume_if may execute.

```
<so_function>   :==   <so_function> <queue> |
                      <queue>
<queue>         :==   QUEUE   interface__<name>,
                              row__<expression> ,
                              col__<expression> ,
                              threshold__<expression>
```

The topographical description defines actual instances of generic jobs, the interconnection of these jobs to other jobs or the graph interface and the assignment of these jobs to physical devices. There are three commands in the topographical_description: the define statement, the connect statement and the assign statement.

```
<topographical__description>   :==   <topographical__description>
                                     <top__stmt> |
                                     <top__stmt>
<top__stmt>   :==   <define> |
                    <connect> |
                    <assign>
```

The define statement represents an instance of an generic task or storage object. More than one instance of the same generic task may be defined. Each instance will have its own set of set of control blocks.

```
<define> :==   instance__<name> : generic__<name>
```

The connect statement shows the interconnection of task, storage object and graph interfaces. The following interconnections rules apply:

a. All connection rules are transitive i.e. A connected to B is the same as B connected to A.

b. An interface must be connected to one and only one interface.
c. Task Read_if are connected to Storage Object Consume_if.
d. Task Read_if are connected to Graph Read_if.
e. Task Write_if are connected to Storage Object Produce_if.
f. Task Write_if are connected to Task Receive_if.
g. Task Send_if are connected to Task Receive_if.
h. Task Send_if are connected to Graph Send_if.
i. Graph Produce_if are connected to Storage Object Produce_if.
j. Graph Consume_if are connected to Storage Object Consume_if.
Graph Send_if are connected to Task Send_if.
l. Graph Receive_if are connected to Task Receive_if.

```
<connect> :==CONNECT <interface_name> TO <interface_name>
<interface_name>  :==  graph_interface_<name> |
                       instance_<name> . interface_<name>
```

The assign command assigns an instance to a particular device.

```
<assign> :== ASSIGN instance_<name> to <device>
```

The productions <name>, <expression>, and <device> have not been defined fully they are:

| | | |
|---|---|---|
| <name> | :== | alpha followed by any number of alphanumeric or underscore "_" characters. |
| <expression> | :== | arithmetic expression for instance: 10, 10+5, 4/2 etc. |
| <device> | :== | something that uniquely identifies a device In our implementation we used two expressions which identified the hardware pi_bus id and ecb_address. |

There are many more features which can be added to the language. Some of these features (named constants, comments, etc.) are for "user friendliness" other features could be added to take advantage of greater hardware capabilities. The queue statement in the storage object, for instance, could be expanded to describe what type of queue is to be used if hardware exits which allows different types of queues.

The semantics of the language has not be discussed in great detail. In general common sense can be used to fill in the holes. For instance it seems logical that a read statement cannot read from or to an interface or buffer that does not exist.

1.2 Mini-Control Blocks. The control blocks used by the CSP project are numerous since they must support many types of hardware and runtime software. For the purpose of this disclosure a smaller, yet representative, set of control blocks are used to describe the translation process. This smaller control block set will be referred to as the mini-control blocks.

The Storage Object Control Block (SOCB) controls access to Global Memory. A SOCB will have the following fields:

GM ADDRESS The address in Global Memory (GM) where data is to be read from or written to.

THRESHOLD Field that LOS comparse against Space or Data available to determine if BCB post associated with this SOCB should be executed.

BCB Address Address of the BCB which is used to send the Space or Data available token.

The Data network Control Block (DCB) is used to control the transfer of data over the Data network. Every read and write statement is converted into a DCB. A DCB will have the following fields:

READ/WRITE This field indicates whether Data is to be transferred from the slave device to the master device (READ), or from the master address to the slave address (WRITE).

LOCAL/REMOTE If the slave device is the same as the master device this is LOCAL. If the slave is different than the master device this is REMOTE.

POST/NOPOST If set to POST the device associated with the DCI will be posted. If that device is in a WAIT state it will begin execution, otherwise an error will occur.

WAIT/NOWAIT If set to WAIT the DCI will not execute the current DCB until a post is received from the associated device.

CHAIN/NOCHAIN If chain then data which follows this DCB is another DCB. If nochain then tell LOS that the DCI has completed.

PATH If this is a REMOTE transfer this field is the path thru the data network from the master to the slave. If this is a local transfer this field is not used.

SLAVE If this is a remote transfer then this is the Address of the SOCB which controls access to the data in Global Memory. If this is a LOCAL transfer then this is the address of the slave buffer.

MASTER This is the address of the master buffer.

AMOUNT The amount of data to transfer.

The Macro Control Block (MCB) is created as the result of an execute statement. The MCB will contain many different types of fields depending on the type of device the MCB is meant to execute on. It will have at the minimum:

POST/NOPOST If set to POST the the DCI associated with this device will be posted. If the DCI is in a WAIT state it will begin execution, otherwise an error will occur.

WAIT/NOWAIT If set to WAIT the current device will not execute until a post is received from the associated DCI.

CHAIN/NOCHAIN If chain then data which follows this MCB is another MCB. If nochain then tell LOS that the device has completed.

NOTE

The POST/WAIT mentioned in the DCB/MCB are different from the post and wait mentioned in the SCB/BCB description. This POST/WAIT mechanism controls the sequencing of DCBs and MCBs (i.e. make sure all of the reads are done before the processing starts, and make sure the processing is done before writes are started.

For example, given the followin task command sequence a. Read b. Read
c. Execute
d. Execute
e. Execute
f. Write
g. Write One list of four DCBs and one list of three MCBs. The first DCB corresponds to the first read, the second DCB the second read, the third DCB the first write, etc. All DCBs except the last will have the Chain_NoChain field set to Chain. The second DCB will have the Post_NoPost field set to Post. The third DCB will have the Wait_NoWait field set to Wait.

The first MCB will have the Wait_NoWait field set to Wait. The third MCB will have the Post_NoPost field set to Post. The first and second MCB will have the Chain_NoChain field set to Chain.

The Synchronization Control Block (SCB) is used to implement the POST/WAIT mechanism.

MASK Each one bit in the mask field represents an action which must be performed be fore the Task or Storage Object which the SCB is part of can be scheduled.

EVENT Each one bit in the event field represents an action which has been performed.

When the EVENT field equals the MASK field LOS will be informed so that it may schedule the task or storage object for execution.

The Bus interface unit Control Block (BCB) is used to send POST tokens to a Synchronization Control Block (SCB) and to send blocks of data over the PI_BUS.

POST/MSG If set to POST then this a POST BCB otherwise this is a message BCB.

SLAVE ID The ID of the ESU receiving the POST or MESSAGE

SLAVE ADDRESS If a POST BCB this is address of the SCB. If a message BCB this is the address of the buffer receiving the data.

POST MASK IF a POST BCB this field indicates the bit position in the SCB Event field to set. If a message BCB this field is not used.

MASTER ADDRESS If a POST BCB this field is not used. If a message BCB this field is the address of the buffer containing the data to be sent.

Amount If a POST BCB this field is not used. If a message BCB this field is the amount of data to be sent.

CHAIN/NOCHAIN If chain then data which follows this BCB is another BCB. If nochain then tell LOS that the BIU has completed.

NOTE

The POST/WAIT mentioned in the BCB are different from the post and wait mentioned in the DCB/MCB description. This POST/WAIT mechanism controls when tasks and storage objects are scheduled for execution.

The Task Management Block (TMB is a software control block which controls the scheduling of a task. It contains four parts. The first part is the SCB control section. The second is a pointer to the DCB list. The third is a pointer to the MCB list. The final is a pointer to the BCB list. When the SCB control section informs LOS that all needed events have occurred the MCB list and DCB list will be scheduled for execution. When the DCB list completes execution the BCB list will be scheduled for execution. When the BCB finishes completion the task is complete.

The Storage Object Management Block (SOMB) is a software control block that controls access to global memory. It contains four parts. The first part is the SCB control section for produce interfaces. The second part is the SCB control section for consume interfaces. The third part is a list of produce SOCBs. The fourth part is a list of consume SOCBs.

When los receives a produce SCB interrupt it does the following a. For each element in the produce SOCB list add the produce amount to the GM address in the SOCB.
b. The produce amount is added to data available and subtracted from space available.

When los receives a consume SCB interrupt it does the following a. For each element in the consume SOCB list add the consume amount to the GM address in the SOCB.
b. The consume amount is subtracted from data available and added to space available.

When los receives a consume or produce SCB interrupt it does the following a. For each entry in the produce SOCB list where the threshold is less than or equal to space available the BCB list associated with the entry is scheduled for execution.
b. For each entry in the consume SOCB list where the threshold is less than or equal to data available the BCB list associated with the entry is scheduled for execution.

The control blocks generated by the compiler are relocatable. These relocatable control blocks are grouped into larger entities call Allocation Units (AUs). An AU is relocatable, but the individual control blocks in the AU can no longer be relocated individually. If an implementation desires, an AU could be defined as one control block and its associated resolution control blocks.

In order for LOS to control a graph two tables are built for LOS by the compiler.

The AU Descriptor list is a list of all AUs and the device they have been assigned.

AU ID A value which uniquely identifies the AU in the graph.

STORAGE Where the AU is located before execution (a file name for instance). This value is not necessarily by the compiler.

DEVICE The Device the AU was assigned to by the compiler.

LOS will determine if the AU can be placed onto the desired device. If it can or if a suitable alternative can be found LOS will extract the AU from storage and place it onto the device.

The AU interconnect list described the number of different DTN paths needed by a graph.

PATH ID A value which uniquely identifies this path in this graph.

MASTER AU ID This is the AU which contains a DCB which has a remote transfer.

SLAVE AU ID This is the AU which contains a SOCB which is the target of a remote transfer.

LOS uses this table to find a path thru the DTN.

In order to make the control blocks generated by the compiler relocatable three resolution control blocks are needed. These control blocks are used by LOS when commanded to activate a graph.

The address resolution list contains:

OFFSET The offset of the field in the current allocation unit which must have its value modified so that it has the correct absolute address.

AU ID Value which uniquely identifies the allocation unit which contains the buffer or control block referenced by the field pointed to by OFFSET.

LOS will use the AU ID to index a table which contains the addresses of where every AU in the graph has been placed. This address is added to the field pointed to by OFFSET.

PI_Bus resolution list contains:

OFFSET The offset of the field in the current allocation unit which must have its value modified so that it contains the correct PI_BUS address.

AU ID Value which uniquely identifies the allocation unit which is referenced by the field pointed to by OFFSET.

LOS will use the AU ID to index a table which contains the PI bus addresses of every AU in this graph. This PI_BUS address is placed into the field pointed to by OFFSET.

DTN path resolution list contains:

OFFSET The offset of the field in the current allocation unit which must have its value modified so that it contains the correct Data Network Path.

PATH ID Value which uniquely identifies the DTN Path to be place in the field pointed to by OFFSET.

LOS will use the PATH ID to index a table which contains the DTN paths from one AU to another AU. This DTN Path address is placed into the field pointed to by OFFSET.

2 IMPLEMENTATION

The language must be parsed and checked for syntactic and semantic errors. It is suggested that a Look Ahead Left to Right (LALR) parser is used since this will facilitate the creation of the parse tree and symbol table needed for the code generation portion.

If no errors are detected by the parser then the code generation procedures may be executed. The code generation procedures are segmented into three parts. The first set are the routines which are encoded to translate the language instructions into the underlying hardware or soft-ware control blocks. The second set of routines, which are called by routines in the first set, move information supplied by the calling routines into the appropriate fields of the hardware or software control blocks. The third set of routines, which are called by routines in the second set, control the definition of labels which represents the location of control blocks, and their fields, defined by the calling routines.

Each routine in the first set correspond directly to a production in the language. For instance the production:

```
<graph>:== GRAPH <name>
           INTERFACE <interface__section>
           DECLARE <generic__job__description>
           BEGIN
           <topographical__description>
           END
```

would have a procedure corresponding to it which has the format:

```
procedure (graph:                out Results;
```

-continued

```
GRAPH1 NAME:                  in Parse__Tree__Node;
       Interface__Section:    in Parse__Tree__Node;
       Generic__Description:  in Parse__Tree__Node;
       Topographical__desc:   in Parse__Tree__Node)
```

The data type Results would have any results of processing the graph placed into it. The type Parse_Tree_Node contains a pointer to all of the parse tree elements which form this node of the parse tree. A routine called process should be written. It has the format:

```
procedure Process (Node: in Parse__Tree__Node:
                   Result: out Results);
```

When called process will call the procedure which is used to process NODE. When that procedure finishes executing its results are returned via results. For instance if it is desired to process the Topographical_description first followed by the Interface section followed by the generic_description the procedure body of graph1 would contain.

```
process (Node => Topographical_Desc,
         Result => Topo_Result);

process (Node => Interface_Section,
         Result => Interface_Result);

process (Node => Generic_Description,
         Result => Generic_Result);
```

Since each language production corresponds to a procedure in the code generation function the language production will be used to identify procedures which exists in the first set.

In the following description the term address is not a physical address but an internal symbol which represents the address. This allows the internal symbol to be assigned to a location even though that location has not yet been determined. The phrase "Reference the Address" indicates that a location, if not already defined, is being given an internal symbol to be used when it is defined. The Phrase "Define the Address" will give a location a previously referenced or new (if not yet referenced) internal symbol. These functions is defined fully in the procedures which are in Set three.

2.1 Set One processing. The procedure which generates code for:

```
<graph>: == GRAPH <name>
            INTERFACE <interface_section>
            DECLARE <generic_job_description>
            BEGIN
            <topographical_description>
            END
```

will process <topographical_description> first. The results of this processing is a List of Instances which must be processed. <Interface_Section> will be processed next (a global variable will be set to indicate that these are graph level interfaces). Each instance returned by the <topographical_description> will result in the <generic_job_description> being processed. The name of the instance and the name of the generic job which this is an instance of will be passed to <generic_description>. Later processing in the <generic_job_description> will determine the actual generic task or storage object to use.

The procedure which generates code for:

<topographical_description> : == <topographical_description> <top_stmt> | will process <topographical_description> followed by <top_stmt>.

The procedure which generates code for:

<topographical_description> : == <top_stmt> will process <top_stmt>.

The procedure which generates code for:

<top_stmt> : == <define> will process <define>.

The procedure which generates code for:

<top_stmt> : == <connect> will process <connect>.

The procedure which generates code for:

<top_stmt> : == <assign> will process <assign>.

The procedure which generates code for:

<define> :== instance_<name> : generic_<name> will place the instance, instance_<name> into the list of instances to be created. The instance will be identified as type generic_<name>. If the generic type is a task then a task SCB label is referenced (see Set three routines). If the generic type is a storage object then produce and consume SCB labels are referenced. Initialize the SCB mask fields to zero. The labels and values should be save in the symbol table under this task or SO instance <name>.

NOTE

Every <name> should have an entry in a Symbol Table.

The procedure which generates code for:

<connect> :== CONNECT <interface_name> TO <interface_name> will process the two <interface_name>s first. For each interface:

if the interface is a task or SO interface and the interface is token controlled then reserve a event bit in the mask. If it is a task reserve a bit the the task SCB mask field. If a SO produce interface reserve a bit in the produce SCB mask field. If a SO consume interface reserve a bit in the consume SCB mask field. The SCB mask(s) should be saved in the Symbol table under the instance name. The bit position and SCB label should be saved in the Symbol table under the interface_<name>.

If the interface is a graph interface do nothing.

Update the symbol table to indicate that the interfaces are connected to each other.

The procedure which generates code for:

<interface_name> :== graph_interface_<name> should return that this is a graph interface.

The procedure which generates code for:

<interface_name> :== instance_<name>. interface_<name> should return that this is a task or SO interface and the type of interface.

The procedure which generates code for:

<assign> :== ASSIGN instance_<name> to <device> should indicate that the instance has been placed on <device>.

The procedure which generates code for:

<interface_section> :== <interface_section> <interface> | should process <interface_section> followed by <interface>.

The procedure which generates code for:

<interface_section> :== nothing should return.

The procedure which generates code for:

<interface> :== PRODUCE_IF <name> should do the following:

If this is a Graph Level interface then access the symbol table for the interface connected to this one. Retrieve the connected interfaces SOCB address, SCB address and SCB bit position. Reference the SOCB address and SCB address and update the Symbol Table. The SCB bit position, SOCB address and SCB address are place in a table used by LOS to connect graphs to graphs.

The procedure which generates code for:

<interface> :==CONSUME_IF <name> should do the following:

If this is a Graph Level interface then access the symbol table for the interface connected to this one. Retrieve the connected interfaces SOCB address, SCB address and SCB bit position. Reference the SOCB address and SCB address and update the Symbol Table. The SCB bit position, SOCB address and SCB address are place in a table used by LOS to connect graphs to graphs.

The procedure which generates code for:

<interface> :== READ_IF <name> should do the following:

If this is a Graph Level interface then access the symbol table for the interface connected to this one. Retrieve the connected interfaces DCB address, SCB address and SCB bit position. Reference the SCB address and SCB address and update the Symbol Table. The SCB bit position, DCB address and SCB address are place in a table used by LOS to connect graphs to graphs.

If this is not a Graph Level interface then access the symbol table for the interface connected to this one. Retrieve the connected interfaces SCB address and SCB bit position. Call the Set two BCB routine to add to the BCB list a post control block. Update the Symbol Table.

The procedure which generates code for:

<interface> :== WRITE_IF <name> should do the following:

If this is a Graph Level interface then access the symbol table for the interface connected to this one. Retrieve the connected interfaces DCB address, SCB address and SCB bit position. Reference the SCB address and SCB address and update the Symbol Table. The SCB bit position, DCB address and SCB address are place in a table used by LOS to connect graphs to graphs.

If this is not a Graph Level interface then access the symbol table for the interface connected to this one. Retrieve the connected interfaces SCB address and SCB bit position. Call the Set two BCB routine to add to the BCB list a post control block. Update the Symbol Table.

The procedure which generates code for:

<interface> :==SEND_IF <name>, buffer_<name> should do the following:

If this is a Graph Level interface then access the symbol table for the interface connected to this one. Retrieve the connected interfaces BCB address. Reference the BCB address and update the Symbol Table. Place the BCB address in a table to be used by LOS to connect a Receive_IF to this Send_IF.

If this is not a Graph Level interface then access the symbol table for the interface connected to this one. Retrieve the connected interfaces buffer address. Retrieve buffer name from the symbol table and retrieve the buffer address. Call the Set two BCB routine to add to the BCB list a message BCB. The Slave address is the buffer address from the interface connected to the current interface. The Master address is the address from the buffer. Place the Address of the BCB in the symbol table for this interface. Update the buffer and interface Symbol Table entries.

The procedure which generates code for:

<interface> :==RECEIVE_IF <name> , buffer_<name> should do the following:

If this is a Graph Level interface then access the symbol table for the interface connected to this one. Retrieve the connected interfaces Buffer address. Reference the Buffer address and update the Symbol Table. Place the buffer address in a table to be used by LOS to connect a Send_IF to this Receive_IF.

If this is not a Graph Level interface then access the symbol table for the interface connected to this one. Retrieve the connected interfaces buffer address. Retrieve buffer name from the symbol table and retrieve the buffer address. Call the Set two BCB routine to add to the BCB list a message BCB. The Slave address is the buffer address from the interface connected to the current interface. The Master address is the address from the buffer. Place the Address of the BCB in the symbol table for this interface. Update the buffer and interface Symbol Table entries.

The procedure which generates code for:

<generic_job_description> :== <generic_job_description> <job> | should process <job> if this job is not the generic description associated with the instance being processed then process <generic_job_description>.

The procedure which generates code for:

<generic_job_description> :== <job> should process <job> if this job is not the generic description associated with the instance being processed then an internal error has occurred.

The procedure which generates code for:

<job> :== <task> should process <task>. <task> will return whether or not this particular generic description is associated with the instance being processed. This information should be returned by <job> to the calling routines.

The procedure which generates code for:

<job> :== <storage_object> should process <storage_object>. <storage_object> will return whether or not this particular generic description is associated with the instance being processed. This information should be returned by <job> to the calling routines.

The procedure which generates code for:

```
<task> :== TASK <name>
           INTERFACE      <interface_section>
           BUFFER         <buffer_declarations>
           BEGIN
               <task_function>
           END
```

should do the following:

If the name of the task matches the name of the generic job for the instance being process then continue processing. Otherwise return that this is not the desired generic instance.

Process the <interface_section>.;

Process the <buffer_declaration> section.

Process the <task_function>.

Call the Set two routine to generate control blocks for the entries in:
the BCB list
the DCB list
the MCB list.
Retrieve the entry for this task from the symbol table and access the SCB address and SCB mask.
Call the Set two routine to generate a TMB and pass in the SCB address, the SCB mask and the BCB, DCB and MCB start addresses.
The procedure which generates code for:

| | |
|---|---|
| <buffer_decelerations> :== <buffer_decelerations> <buffer> | |

should process <buffer_decelerations> followed by <buffer>.
The procedure which generates code for:

| | |
|---|---|
| <buffer_decelerations> :== <buffer> | |

should process <buffer>.
The procedure which generates code for:

| | |
|---|---|
| <buffer> | :== PS_BUFFER <name> , <expression> |

should do the following: Evaluate the <expression>. Retrieve the symbol table entry for the buffer name from the symbol table. Using the address retrieve from the symbol table define the address of a buffer of size <expression> in Program Store. Update the symbol table entry for the buffer.
The procedure which generates code for:

| | |
|---|---|
| <buffer> | :== LS_BUFFER <name> , <expression> |

should do the following: Evaluate the <expression>. Retrieve the symbol table entry for the buffer name from the symbol table. Using the address retrieve from the symbol table define the address of a buffer of size <expression> in Local Store. Update the symbol table entry for the buffer.
The procedure which generates code for:

| | |
|---|---|
| <task_function> :== <task_function> <stmt> | |

should process <task_function> followed by <stmt>.
The procedure which generates code for:

| | |
|---|---|
| <task_function> :== <stmt> | |

should process <stmt>.
The procedure which generates code for:

| | |
|---|---|
| <stmt> | :== <read> |

should process <read>.
The procedure which generates code for:

| | |
|---|---|
| <stmt> | :== <write> |

should process <write>.
The procedure which generates code for:

| | |
|---|---|
| <stmt> | :== <execute> |

should process <execute>.
The procedure which generates code for:

| | | | |
|---|---|---|---|
| <read> | :== | READ | source_<name> ,<br>target_<name> ,<br>amount_<expression> |

should do the following:
Evaluate the <expression>.
Retrieve the source name entry from the symbol table.
If the source is a buffer then get the buffer address. Indicate that this is a local transfer.
If the source is a read interface then access the consume interface on the other end and get the SOCB addresses. Indicate that this is a remote transfer.
Retrieve the target name entry form the symbol table and get the buffer address.
If the previous <stmt> processed was an execute statement the set Wait_NoWait to Wait, otherwise set it to NoWait.
Call the Set two DCB routine to add a DCB read to the DCB list. The DCB routine is supplied with:
the source address as the slave address
the target address as the master address
The transfer type (remote or local)
The transfer amount
Wait_NoWait.
The procedure which generates code for:

| | | | |
|---|---|---|---|
| <write> | :== | WRITE | source_<name> ,<br>target_<name> ,<br>amount_<expression> |

should do the following:
Evaluate the <expression>.
Retrieve the target name entry from the symbol table.
If the target is a buffer then get the buffer address. Indicate that this is a local transfer.
If the target is a write interface then access the produce interface on the other end and get the SOCB addresses. Indicate that this is a remote transfer.
Retrieve the source name entry from the symbol table and get the buffer address.
If the previous <stmt> processed was an execute statement the set Wait_NoWait to Wait, otherwise set it to NoWait.
Call the Set two DCB routine to add a DCB write to the DCB list. The DCB routine is supplied with:
the source address as the master address
the target address as the slave address
The transfer type (remote or local)
The transfer amount.
Wait_NoWait.
The procedure which generates code for:

| | | |
|---|---|---|
| <execute> :== | EXECUTE | command_<name> <parameters> |

should process the <parameters>. The rest of the processing is dependant on the type of device this statement is meant to execute on. At the very least the MCB which is the result of the processing must be placed into the MCB list and the DCB routine to set post must be called.

The procedure which generates code for:

```
<storage_object> :==
        STORAGE_OBJECT <name>
        INTERFACE <interface_section>
        ATTRIBUTES <attribute_declarations>
        BEGIN
            <so_function>
        END
```

If the name of the SO matches the name of the generic job for the instance being process then continue processing. Otherwise return that this is not the desired generic instance.

Process the <interface_section>.

Process the <attribute_declaration> section.

Process the <SO_function>.

Call the Set two routine to generate control blocks for the entries in:

the BCB produce list the BCB consume list the SOCB produce list the SOCB consume list.

Retrieve the entry for this SO from the symbol table and access the produce and consume SCB address and SCB mask.

Call the Set two routine to generate a SOMB and pass in the produce and consume amounts, the SCB addresses, the SCB masks and the BCB and SOCB start addresses.

The procedure which generates code for:

| | | |
|---|---|---|
| <attribute_declarations> | :== | number_of_rows_<expression> ,<br>number_of_cols_<expression> ,<br>produce_amount_<expression> ,<br>consume_amount_<expression> |

should evaluate the expressions. The number of rows and number of columns should be used to calculate the amount of global memory needed by this SO. The produce and consume amounts should be returned to the <storage_object> routine.

The procedure which generates code for:

```
<so_function> :== <so_function> <queue>
```

should process <so_function> followed by <queue>.

The procedure which generates code for:

```
<so_function> :== <queue>
```

should process <queue>.

The procedure which generates code for:

| | | |
|---|---|---|
| <queue> | :== QUEUE | interface_<name>,<br>row_<expression> ,<br>col_<expression> ,<br>threshold_<expression> |

should do the following:

Evaluate the row, column and threshold expression.

Retrieve the interface_<name> entry from the symbol table. Retrieve the connected interfaces SCB address and SCB bit position. Call the Set two BCB routine to add to the BCB list a post control block.

Based upon the type of interface (produce or consume) decide whether the SOCB to be generated should be placed into the consume SOCB list or the produce SOCB list.

Call the Set two routine SOCB in order to place an SOCB into the appropriate SOCB list. The SOCB routine should be passed:

The row and column value.

The threshold value.

SOCB address retrieve from the interface_<name> entry.

Address of BCB for this interface.

2.2 Set Two Procedures. Set two handle the creation of hardware and software control blocks. Every non-resolution control block has one or more procedures dedicated to the creation of that control block. The procedures to handle the control blocks have the following Characteristics:

The ability to set fields in a control block which has already been added to a list.

The ability to Add a control block to a list of similar control blocks. In general each field in a control block is reflected as a parameter in the Add a control block procedures. The exception are control block fields that can be derived. An example of one of these control block fields would be the Chain Field. The Chain Field can be set to NOCHAIN initially. As a new control block is added to the list the Chain Field of the control block which is currently at the end of the list can be changed to CHAIN.

The ability to Generate the physical control blocks given a list of control blocks.

Some of the above functions may be combined into one procedure.

The Set two procedures to manipulate SOCBs have three procedures. They are:

ADD_TO_LIST Add_to_List has the following parameters (unless otherwise noted these parameters have the same meaning as the control block field of the same name).

SOCB List, Used to indicate if the SOCB is to be placed into the consume or produce SOCB list.

Row and Column, These values are used to calculate the initial SOCB Global Memory Address.
Threshold
BCB Address
The parameters are used as follows:
A new entry is created for the SOCB list.
Row and column are used to calculate the GM Address field.
Threshold is place into the Threshold list.
The BCB Address is referenced and placed into the BCB Address field.
This SOCB is added to the end of the list.
GENERATE The generate procedure has the following parameters:
SOCB list
Start Address
The parameters are used as follows:
The Start Address is defined as the first SOCB in the list.
Every SOCB in the list is converted to the correct binary format and is placed into the list of control blocks to be assigned an allocation unit.

The Set two procedures to manipulate DCBs have four procedures. They are:
ADD_TO_LIST Add_to_List has the following parameters (unless otherwise noted these parameters have the same meaning as the control block field of the same name).
Read_Write,
Local_Remote
Wait_NoWait
Slave
Master
Amount
The parameters are used as follows:
A new entry is created for the DCB list.
Read_Write, Local_Remote, Wait_NoWait are placed into their appropriate fields.
The Slave and Master Addresses are referenced and placed into their respective fields.
If a remote transfer the Set three routine, DTN_Resolution, is called to create a DTN resolution
The Chain field is set to NOCHAIN
The Chain field of the DCB at the end of the current list (if any) is set to CHAIN.
This DCB is added to the end of the list.
SET_Post This routine will set the post_nopost filed of the DCB currently last in the list to Post.
GENERATE The generate procedure has the following parameters:
Start Address
The parameters are used as follows:
The Start Address is defined as the first DCB in the list.
Every DCB in the list is converted to the correct binary format and is placed into the list of control blocks to be assigned an allocation unit.

The Set two procedures to manipulate BCBs have three procedures. They are:
ADD_TO_LIST Add_List has the following parameters (unless otherwise noted these parameters have the same meaning as the control block field of the same name).
BCB_Address
Post_Msg
Post_Mask
Slave
Master
Amount
The parameters are used as follows:
A new entry is created for the BCB list.
The BCB_Address is defined to be the address of this BCB.
Post_Msg, Post_Mask, and Amount are placed into their appropriate fields.
The Slave and, if a message BCB, the Master Addresses are referenced and placed into their respective fields.
The Set Three routine, Slave_id_Resolution, is called to set up Slave_id Resolution control blocks.
The Chain field is set to NOCHAIN
The Chain field of the BCB at the end of the current list (if any) is set to CHAIN.
This BCB is added to the end of the list.
GENERATE The generate procedure has the following parameters:
Start Address
The parameters are used as follows:
The Start Address is defined as the first BCB in the list.
Every BCB in the list is converted to the correct binary format and is placed into the list of control blocks to be assigned an allocation unit.

The Set two procedures to manipulate TMBs has one procedure. It is:
Generate Generate has the following parameters (unless otherwise noted these parameters have the same meaning as the control block field of the same name).
SCB_Address
SCB_Mask
BCB_Address
DCB_Address
MCB_Address
The parameters are used as follows:
The SCB_Address is defined.
The SCB_Mask is placed into the appropriate fields. 1i.The BCB, DCB and MCB Addresses are referenced and placed into their respective fields.
The TMB is converted to the correct binary format and is placed into the list of control blocks to be assigned an allocation unit.

The Set two procedures to manipulate SOMBs has one procedure. It is:
Generate Generate has the following parameters (unless otherwise noted these parameters have the same meaning as the control block field of the same name).
Produce_SCB_Address
Produce_SCB_Mask
Consume_SCB_Address
Consume_SCB_Mask
Produce_SOCB_Address
Consume_SOCB_Address
The parameters are used as follows:
The SCB_Address is defined.
The SCB_Mask is placed into the appropriate fields. 1i.The BCB, DCB and MCB Addresses are referenced and placed into their respective fields.

The TMB is converted to the correct binary format and is placed into the list of control blocks to be assigned an allocation unit.

2.3 Set Three Procedures. The Set Three procedures handle the manipulation of internal symbols which are used to reference actual locations (addresses). In addition these routines handle the definition of the resolution control blocks needed to make the graph relocatable. Internal symbols exists in three states: undefined, referenced and defined. All Internal symbols are initialy in the undefined state.

The Address_Reference routine is called when ever a location is being reference. It has the following parameters:

Referenced_Address
Address_Resolution_Offset

The parameters are used as follows:

If Referenced_Address is undefined it is assigned a unique internal symbol in the referenced state. This is returned to the calling routine and must be used as the value of the control block fields which is referencing "Referenced_Address."

The Address_Resolution_Offset is assigned a unique internal symbol in the referenced state. This is returned to the calling routine and must be assigned the location of the control block field which is referencing "Referenced_Address." symbol.

Both parameters are paired together, identified as an Address Resolution entry, and are placed in the Resolution Database for future processing.

The Slave_ID_Resolution routine is called when a BCB Slave_Id is being reference. It has the following parameters:

BCB_Slave_Address
Slave_id_Resolution_Offset

The parameters are used as follows:

If BCB_Slave_Address is undefined it is assigned a unique internal symbol in the referenced state. This is returned to the calling routine and must be used as the value of the Slave_Address field in the BCB.

The Slave_id_Resolution_Offset is assigned a unique internal symbol in the referenced state. This is returned to the calling routine and must be assigned the location of the Slave_Id BCB field.

Both parameters are paired together, identified as a Slave id Resolution entry, and are placed in the Resolution Database for future processing.

The DTN_Resolution routine is called when a DCB Route is being reference. It has the following parameters:

DCB_Master_Address
DCB_Slave_Address
DTN_Path_Resolution_Offset

The parameters are used as follows:

If DCB_Slave_Address is undefined it is assigned a unique internal symbol in the referenced state. This is returned to the calling routine and must be used as the value of the Slave_Address field in the DCB.

If DCB_Master_Address is undefined it is assigned a unique internal symbol in the referenced state. This is returned to the calling routine and must be used as the value of the Master_Address field in the DCB.

The DTN_Path_Resolution_Offset is assigned a unique internal symbol in the referenced state. This is returned to the calling routine and must be assigned the location of the DNT Path BCB field.

All three parameters are paired together, identified as a DTN Resolution entry, and are placed in the Resolution Database for future processing.

The Define_Address routine is called when a location has been determined and an internal symbol is desired. It has the following parameters:

Location_Address

The parameters are used as follows:

If Location_Address is undefined it is assigned a unique internal symbol in the defined state. If Location_Address is referenced then its state is changed from reference to defined (note the symbol itself does not change). If it is the defined state an internal error has occurred. This is returned to the calling routine and must be assigned the location of the position being defined.

The newly defined symbol is paired with an control block identifier which identifies what specific control block was being defined when the internal symbol was defined. This pairing is placed into the Defended symbol for future processing.

The Generate_Resolution_Lists is called after control blocks have been placed into Allocation Units. At this point all internal symbols should be in the defined state. The routine which places control blocks into AUs should pair the Control Block Identifier with the AU Identifier an make this information available to this routine.

For each entry in the Resolution Database do the following:

If the entry is an Address Resolution entry then:
Look up the Referenced Address in the Defined Symbol Database to find what Control Block Identifier it is associated with.
Use the Control Block Identifier to determine which AU the Control Block is in.
Use the AU id in the Address Resolution Control block being created.
Place the Address_Resolution_Offset in the Address Resolution Control block being created.
Look up the Address_Resolution_offset in the Defined Symbol Database to find what Control Block Identifier it is associated with.
Use the Control Block Identifier to determine which AU the Control Block is in.
Place the Address Resolution Control Block in that AU.

If the entry is an Slave id Resolution entry then:
Look up the BCB_Slave_Address in the Defined Symbol Database to find what Control Block Identifier it is associated with.
Use the Control Block Identifier to determine which AU the Control Block is in.
Use the AU id in the PI_Bus Resolution Control block being created.
Place the Slave_id_Resolution_Offset in the PI_Bus Resolution Control block being created.
Look up the Slave_id_Resolution_offset in the Defined Symbol Database to find what Control Block Identifier it is associated with.
Use the Control Block Identifier to determine which AU the Control Block is in.
Place the PI_Bus Resolution Control Block in that AU.

If the entry is an DTN Resolution entry then:
Slave_id_Resolution_Offset

Look up the DCB_Slave_Address in the Defined Symbol Database to find what Control Block Identifier it is associated with.

Use the Control Block Identifier to determine which AU the Control Block is in.

Use the AU id as the Slave AU in the AU interconnect entry being created.

Look up the DCB_Master_Address in the Defined Symbol Database to find what Control Block Identifier it is associated with.

Use the Control Block Identifier to determine which AU the Control Block is in.

Use the AU id as the Master AU in the AU interconnect entry being created.

Assign the interconnect entry a path id and add it to the interconnect list.

Place the Path'Id into the the DTN resolution entry being created.

Place the DTN_Path_Resolution_Offset in the DTN Resolution Control block being created.

Place the DTN Resolution Control Block in the AU which the master address is in.

After all entries have been processed the generate the AU interconnect list.

3 ALLOCATION UNIT GENERATION.

Before Resolution processing can be performed all control blocks must be placed into an allocation unit.

After all objects have had their control blocks created the objects will be assigned to an Allocation Unit (AU). An AU is the smallest reloacatable entity known to the operating system. Multiple objects may be grouped into the same AU if the following rules are not broken:

The objects have been assigned to the same device.

The AU does not become larger than the maximum AU size.

The procedure for assigning an object into an AU is as follows:

a. Group all objects which have been assigned to the same device into list.

b. Sort the list so that the objects which uses the most space are first in the list.

c. For the initial number of AUs estimate assume that one AU is needed for each unique device.

d. Calculated the AU overhead. The AU overhead is:

Known AU header space plus

Number of AU dependent Header space times the estimated number of AUs.

e. Assign the objects to AU as follows:

1. Using the size of the current object find the first first AU which is on the same device and has enough available space to hold it. If no AU meet the requirements then create a new AU and subtract the AU overhead size from the new AU available space. Place the object into the AU which was found or the new one created. Subtract the size of the object from the available space in the AU.

2. Repeat until all objects have been assigned.

f. If more AUs were used than the estimated number of AUs then recalculate the AU overhead using the number of AUs that were needed and repeat the previous step (assigning objects to AUs) followed by this step. If the number of AUs used is less than or equal to the Estimated number of AUs needed then AU assignment has been completed.

For Each AU created a AU decriptor is created.

Although a specific embodiment of the invention has been disclosed, it will be understood by those having skill in the art that minor changes can be made to that specific embodiment without departing from the spirit and the scope of the invention.

What is claimed is:

1. For a distributed processing system including a plurality of distributed data processing elements, each of which having a local operating system for controlling operations therein and each having an associated storage means for storing at least one control block for defining functions to be performed by a data processing element in accordance with its local operating system, said plurality of data processing elements being interconnected by a data bus and a control bus, a method for compiling a master task definition data set for defining a logical data flow of said distributed processing system for accomplishing a specific complex function, comprising the steps of:

inputting a user defined task description in a form of a high level language instruction which specifies what the task does, which other tasks a given task is associated with, and on what data processing element the given task is executed;

providing control blocks of three different types, a first type for controlling execution of tasks within said data processing element, a second type controlling transfer of data between tasks, and a third type controlling interdependent tasks by sending control tokens between tasks;

assembling addresses and routing information in control blocks to enable interconnection of tasks, as specified in a master task definitional data set;

assembling user defined parameters in a master task definition data set, into respective control blocks;

assembling a dependency mask in respective control blocks defining the tokens necessary to authorize execution of a task;

outputting a bit map representation of a plurality of control blocks, to enable said distributed processing system to carry out said specific complex function.

2. The method of claim 1 which further comprises:

token mask in said control block including a plurality of binary bits, each bit representing existence or nonexistence of a token defined dependency on another task.

3. The method of claim 1 which further comprises:

assembling a resolution control block relating address information for a plurality of control blocks;

said data processing elements including a first plurality of first type elements and a second plurality of second type elements;

said control block associated with said first type elements being relocatable among said first type elements based on said address information in said resolution control block;

said control blocks associated with said second type elements being relocatable among said second type elements based on said address information in said resolution control block;

whereby specific tasks can be executed by either a first data processing element or alternately a second data processing element within a same type.

4. For a distributed processing system including a plurality of distributed data processing elements, each of which having a local operating system for controlling operations therein and each having an associated storage means for storing at least one control block for defining functions to be performed by a data processing element in accordance with its local operating system, said plurality of data processing elements being interconnected by a data bus and a control bus, a method for compiling a master task definition data set for defining a logical data flow of said distributed processing system for accomplishing a specific complex function, comprising the steps of:

a. reading in user created graph description and checking graph notation for syntactic and semantic correctness;
b. creating for each object defined in the graph description, non-resolution control blocks as follows;
   1. creating a token controlled post/wait mask;
   2. processing all of object's interconnections to determine a token mask for the object and a token position for an interface;
   3. saving a token position for each interface so that the interface which is connected to a current interface will be related to token position to be set when appropriate conditions occur;
   4. saving the token mask for insertion in an appropriate control block;
c. creating a token controlled post/wait posting mechanism;
d. creating hardware and operating system control blocks for the object;
e. assigning the objects to an allocation unit after all objects have had their control blocks created;
f. calculating resolution control blocks needed to make allocation units relocatable based upon the control block interconnection information saved when the control blocks are created;
g. replacing all symbolic labels with a value of an actual location of the control block which a label represents;
h. outputting a binary stream which is a result of the preceding steps, as an executable, run-time code for a graph object.

5. For a distributed processing system including a plurality of distributed data processing elements, each of which having a local operating system for controlling operations therein and each having an associated storage means for storing at least one control block for defining functions to be performed by a data processing elements in accordance with its local operating system, said plurality of data processing elements being interconnected by a data bus and a control bus, a method for compiling a mast task definition data set for defining a logical data flow of said distributed processing system for accomplishing a specific complex function, comprising the steps of:

a. reading in user created graph description;
b. creating for each object defined in the graph description a non-resolution control block;
c. creating a token controlled post/wait posting mechanism;
d. creating hardware and operating system control blocks for the object;
e. assigning objects to an allocation unit after all objects have had their control blocks created;
f. calculating resolution control blocks needed to make allocation units relocatable based upon the control block interconnection information saved when the control blocks were created;
g. replacing all symbolic labels with a value of an actual location of the control block which label represents;
h. outputting a binary stream which is a result of the preceding steps, as an executable, run-time code for a graph object.

6. For distributed processing system including a plurality of distributed data processing elements which can be of a plurality of types, including input/output controllers, storage controllers, and arithmetic elements, each of which having a local operating system for controlling operations therein and each having an associated storage means for storing at least one control block for defining functions to be performed by a data processing element in accordance with its local operating system, said plurality of data processing elements being interconnected by a data bus and a control bus, a method for compiling a master task definition data set for defining a logical data flow of said distributed processing system for accomplishing a specific complex function, comprising the steps of:

inputting a user defined task description in a form of a high level language instruction which specifies what the task does, which other tasks a given task is associated with, and on what data processing element the given task is executed;

providing control blocks of three different types, a first type for controlling execution of tasks within said data processing element, a second type controlling transfer of data between tasks, and a third type controlling interdependent tasks by sending control tokens between tasks;

assembling addresses and routing information in control blocks to enable interconnection of tasks, as specified in a master task definitional data set;

assembling user defined parameters in a master task definition data set, into respective control blocks;

assembling a dependency mask in respective control blocks defining the tokens necessary to authorize execution of a task;

outputting a bit map representation of a plurality of control blocks, to enable said distributed processing system to carry out said specific complex function.

* * * * *